United States Patent [19]
Staver et al.

[11] Patent Number: 5,953,354
[45] Date of Patent: Sep. 14, 1999

[54] LASER RESONATOR OPTICAL ALIGNMENT

[75] Inventors: Phillip Randall Staver, Hagaman; William Taylor Lotshaw, Niskayuna, both of N.Y.

[73] Assignee: General Electric Co., Schenectady, N.Y.

[21] Appl. No.: 09/017,932

[22] Filed: Feb. 3, 1998

[51] Int. Cl.$^6$ ................................................. H01J 3/098
[52] U.S. Cl. ........................ 372/18; 372/17; 372/19; 372/20; 372/29; 372/33; 372/107; 372/108
[58] Field of Search ................................. 372/15, 16, 18, 372/17, 19, 20, 29, 33, 39, 69, 70, 72, 92, 107, 108

[56] References Cited

U.S. PATENT DOCUMENTS

| | | | |
|---|---|---|---|
| 3,814,507 | 6/1974 | Osborn et al. | 372/107 X |
| 3,883,820 | 5/1975 | Burns et al. | 372/107 X |
| 4,144,505 | 3/1979 | Angelbeck et al. | 372/107 X |
| 4,268,799 | 5/1981 | McCrickerd | 372/107 X |
| 4,438,517 | 3/1984 | Bobb et al. | 372/99 |
| 4,703,491 | 10/1987 | Lim | 372/93 |
| 5,079,772 | 1/1992 | Negus et al. | 372/18 |
| 5,097,471 | 3/1992 | Negus et al. | 372/18 |
| 5,185,750 | 2/1993 | Kafka et al. | 372/18 |
| 5,200,965 | 4/1993 | Okuyama et al. | 372/29 |
| 5,212,698 | 5/1993 | Kafka et al. | 372/18 |

OTHER PUBLICATIONS

Koechner, *Solid–State Laser Engineering*, 1996, pp. 225, 226, 500–561.

Staver et al, "Kerr Lens Effects on Transverse Mode Stability and Active versus Passive Modelocking in Solid State Lasers," OSA Proceedings on Advanced Solid State Lasers, 1994, pp. 344–346.

Siders et al, "Self–starting 30 fs Ti :Sapphire Laser Synchronously Pumped by a pointing–stabilized Nd:YAG Laser," C.L.E.O. Technical Digest, Paper CThI–10, 1994, pp. 324–325.

Krausz et al, "Generation of 33–fs optical pulses from a Solid–State Laser," Optics Letters, vol. 17, No. 3, 1992, pp. 204–206.

Bridges et al, "Effect of Beam Ellipticity on Self–Mode Locking in Lasers," Optics Letters, vol. 18, No. 23, 1993, pp. 2026–2028.

Magni et al, "ABCD Matrix Analysis of Propagation of Gaussian Beams Through Kerr Media," Optical Communications 96, 1993, pp. 348–355.

Casperson et al, "Gaussian Modes in High Loss Laser Resonators," Applied Optics, vol. 14, No. 5, pp. 1193–1198.

(List continued on next page.)

*Primary Examiner*—Brian Healy
*Attorney, Agent, or Firm*—Marvin Snyder; Douglas E. Stoner

[57] ABSTRACT

A laser resonator includes a laser medium having opposite end faces inclined at Brewster's angle and disposed in optical alignment between spaced-apart and tilted first and second optical elements. A method for adjusting the optical alignment includes pumping the laser medium to produce a laser beam, and adjusting separation spacing between the two optical elements. Tilt of at least one of the optical elements is adjusted in response to any observed change in beam cross-sectional size. In an additional embodiment, the laser medium is initially positioned at about equal spacings between the first and second elements. Position of the laser medium is then adjusted, at a constant value of the separation spacing, to within a position range selected for a specific value of a ratio of intracavity peak power of circulation of the laser beam and a critical power for self-focusing to effect discrimination of mode-locked operation over continuous wave operation.

20 Claims, 12 Drawing Sheets

OTHER PUBLICATIONS

Valdmanis et al, "Design Considerations for a Femtosecond Pulse Laser Balancing Self Phase Modulation, Group Velocity, Dispersion, Saturable Absorption, and Saturable Gain," IEEE J. Quant. Elect., vol. 22, No. 1, 1986, pp. 112–118.

Krausz et al, "Femtosecond Solid–State Lasers," IEEE J. Quant. Elect., vol. 28, No. 10, 1992, pp. 2097–2122.

Brabec et al, "Mode Locking in Solitary Laser,"Optics Letters, vol. 16, No. 24, 1991, pp. 1961–1963.

Dijaili et al, "ABCD Matrices for Dispersive Pulse Propagation," IEEE J. Quant. Elect., vol. 26, No. 6, 1990, pp. 1158–1164.

Chilla et al, "Spatial–Temporal Analysis of the Self–Mode–Locked Ti:Sapphire Laser," J. Opt. Soc. Am. B/vol. 10, No. 4, 1993, pp. 638–643.

LASER RESONATOR OPTICAL ALIGNMENT

BACKGROUND OF THE INVENTION

This invention relates generally to laser systems, and, more specifically, to optical alignment of elements in a laser resonator.

A laser system includes a laser resonator or cavity containing a suitable laser material which may be in the form of a crystal or glass optically aligned between a pair of opposing optical elements such as lenses or mirrors. The laser material may be optically pumped by arc lamps or other lasers, for example, for generating a laser beam in the resonator. The resonator may be operated in continuous wave (cw) or pulsed modes of operation. The laser resonator design becomes more complex as the time duration of the laser pulses become smaller, with femtosecond (fs) pulsed lasers typically being the most sophisticated and complex.

Typical laser resonators require various other optical elements for obtaining suitable performance in specific applications of increasing complexity. Each optical element of the laser system typically has five degrees of freedom which must be accurately controlled to achieve proper alignment. Each element may be mounted in a fixture that allows positioning of the elements along three orthogonal coordinate axes, with two degrees of tilt. As more optical elements are required in the laser system, the complexity of achieving accurate optical alignment of all of the elements increases. For example, it may take several months to properly adjust all of the individual optical elements in a sophisticated pulsed laser resonator in order to achieve stable operation with suitable performance. Such adjustments are often made by trial and error, which leads to the lengthy setup time.

Accordingly, it is desirable to reduce the time required for optically aligning the various elements in a laser resonator to effect suitable resonator stability and desired performance.

Laser cavities frequently employ flat-surfaced elements tilted at Brewster's angle to allow for a lossless, intracavity propagation of one polarization mode. However, this requires use of powered elements (focusing or defocusing) in the cavity that are tilted to compensate for coma and astigmatism that are induced by the Brewster elements. Since the stability and spatial symmetry of the output laser mode are sensitive to the amount of aberration compensation, the tilt of powered elements must be accurately determined and set in order to maintain a symmetric (or $TEM_{00}$) output mode that is insensitive to cavity misalignments.

Laser operators most commonly align each tilted cavity element by calculating the required orientation of the element (to compensate for induced aberrations by other elements) and placing the element in the cavity at the calculated angle. The element is then adjusted to maximize the output laser power or minimize the threshold for laser oscillation. However, this method only implicitly determines alignment of the element since an accurate tilt measurement is never made. This is because absolute angle measurements are usually impossible to make since the relative angular orientation of two cavity elements in some common coordinate system is rarely known. Consequently, a configuration that optimizes the laser power may not result in a symmetric (or $TEM_{00}$) output mode. Even if the output power is maximized, laser performance can be adversely affected by small perturbations in the cavity configuration.

Sometimes, a trial and error method is employed by looking at different tilt adjustments of the optical element of interest. This inherently time-consuming method requires that the cavity be realigned for each tilt setting. Unfortunately, the results of this method are difficult to interpret because of difficulty in distinguishing a lack of aberration compensation from an alignment error.

Solid-state laser resonators typically operate with a transverse (spatial) beam mode which explicitly depends upon the optical properties of the laser crystal under the applied thermal and optical load of the pump and oscillating laser beams. The stability of a particular transverse beam mode determines whether or not that beam can be supported by the laser resonator and generate useful output power. Usually, more than one transverse beam mode is stable, and the resonator output energy comprises a linear superposition of several modes, weighted by the net gain experienced by each mode. If one mode is strongly gain favored, it may undesirably drive the gain for the other modes below the laser threshold, resulting in output energy of a single transverse mode.

When the optical properties, including focal power, of the laser crystal are modulated by the instantaneous intensity of the applied laser fields through a nonlinear refractive index, a specific temporal format for the output transverse laser mode may be favored. Since the desired applications of the laser output mode usually constrain the temporal format and frequency content of the laser radiation to particular ranges of pulse duration and linewidth, it is desirable to modify the design of the laser resonator and constrain adjustable values such as instantaneous pump power, oscillating bandwidth, output coupling, etc., so that the desired transverse mode and temporal format is significantly favored over competing transverse modes and temporal formats.

It is also desired to address resonator designs in which the coupling of the transverse, intracavity mode symmetry to the laser-induced focal power in the laser crystal discriminates between the true cw (continuous wave) and continuously pulsed operating formats, especially the true cw and passive mode-locked operating format of cw-pumped solid-state lasers, and between true cw, passive mode-locked, and forced mode-locked operating formats in synchronously-pumped solid state lasers. Passive and forced modelocking in synchronously pumped lasers are distinguished by the absence or presence of a constant temporal phase relationship between the pulses of the pump and oscillating lasers.

SUMMARY OF THE INVENTION

A laser resonator includes a laser medium having opposite end faces disposed in optical alignment between spaced apart and tilted first and second optical elements. A method for adjusting the optical alignment includes pumping the laser medium to produce a laser beam, and adjusting separation spacing between the two optical elements. Tilt of at least one of the optical elements is adjusted in response to any observed change in beam size. In an additional embodiment, the laser medium is initially positioned at about equal spacings between the first and second elements. Position of the laser medium is then adjusted, at a constant value of the separation spacing, to within a range selected to achieve a specific ratio of intracavity peak power of laser beam circulation to a critical power for self-focusing, to effect discrimination of mode-locked operation over continuous wave operation.

DESCRIPTION OF THE PREFERRED EMBODIMENT(S)

Figure 1:
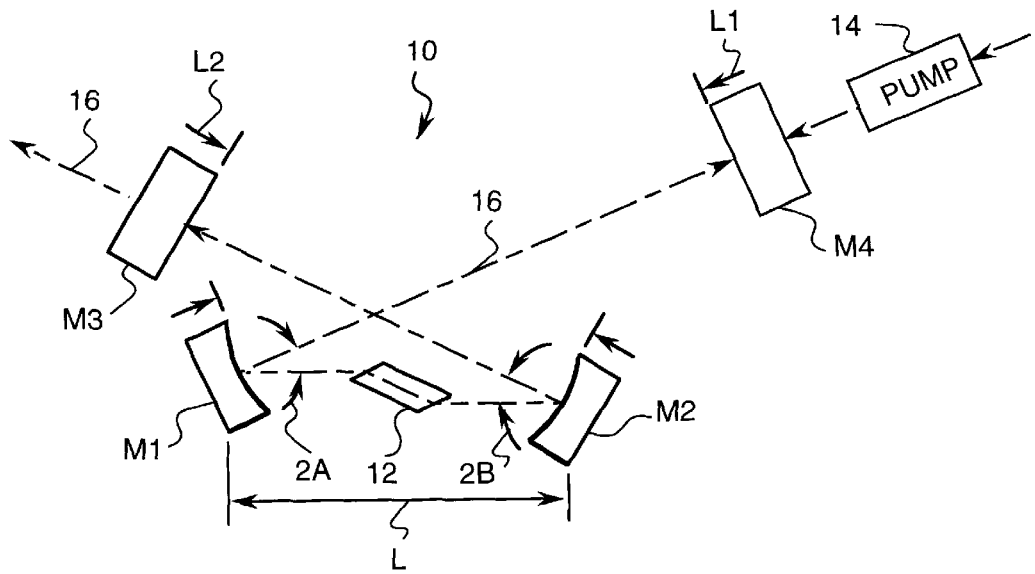
FIG. 1 is a schematic representation of a conventional folded laser resonator including a laser medium disposed in optical alignment between a pair of tilted optical elements further cooperating with an output coupler and reflector.

FIG. 1 illustrates a laser cavity or resonator 10 which includes a suitable laser medium 12 optically aligned between a first optical element M1 and a second optical element M2. Optical elements M1, M2 may be of any conventional form, such as curved focusing mirrors with suitable spherical concave radii. The second mirror M2 is optically aligned with an output coupler M3, such as a conventional mirror having suitable reflectivity. The first mirror M1 is optically aligned with a suitable reflector M4, such as a conventional high reflectivity flat mirror. These optical elements comprise a conventional folded-resonator configuration.

An optical pump 14 is provided for optically pumping laser medium 12 to generate or propagate a laser beam 16 in resonator 10. Pump 14 may comprise another laser optically coupled to various optical elements of resonator 10. For example, pump 14 may be optically aligned with the backside of reflector M4, so as to emit a suitable laser pump beam through reflector M4 toward first mirror M1. Reflector M4 is optically transparent to the wavelength of the pump beam, while being highly reflective to the different wavelength of resonator laser beam 16 propagated in resonator 10. The generated laser beam 16 is emitted from resonator 10 through output coupler M3.

In the exemplary embodiment of FIG. 1, laser medium 12 is preferably in the form of a conventional laser crystal or rod, such as Ti:sapphire, which preferably has opposite end faces cut at the conventional Brewster's angle. First and second mirrors M1, M2 are spaced apart from each other at an optical separation spacing L, and each of these mirrors has a suitable tilt for optically aligning laser beam 16 between the several elements of resonator 10. First and second mirrors M1, M2 have corresponding first and second tilt angles A and B, where A represents one-half of the included angle 2A of laser beam 16 at first mirror M1 and between laser rod 12 and reflector M4, and B represents one-half of the included angle 2B of laser beam 16 at second mirror M2 between laser rod 12 and output coupler M3.

First mirror M1 and reflector M4 are suitably spaced apart at a separation spacing L1, while second mirror M2 and output coupler M3 are suitably spaced apart at a different separation spacing L2. The folded laser resonator 10 illustrated in FIG. 1 is merely an example of a conventional laser resonator which may be optically aligned in accordance with an improved method of the present invention for systematically optimizing alignment of the elements to effect suitable compensation of astigmatism, for example.

Figure 2:
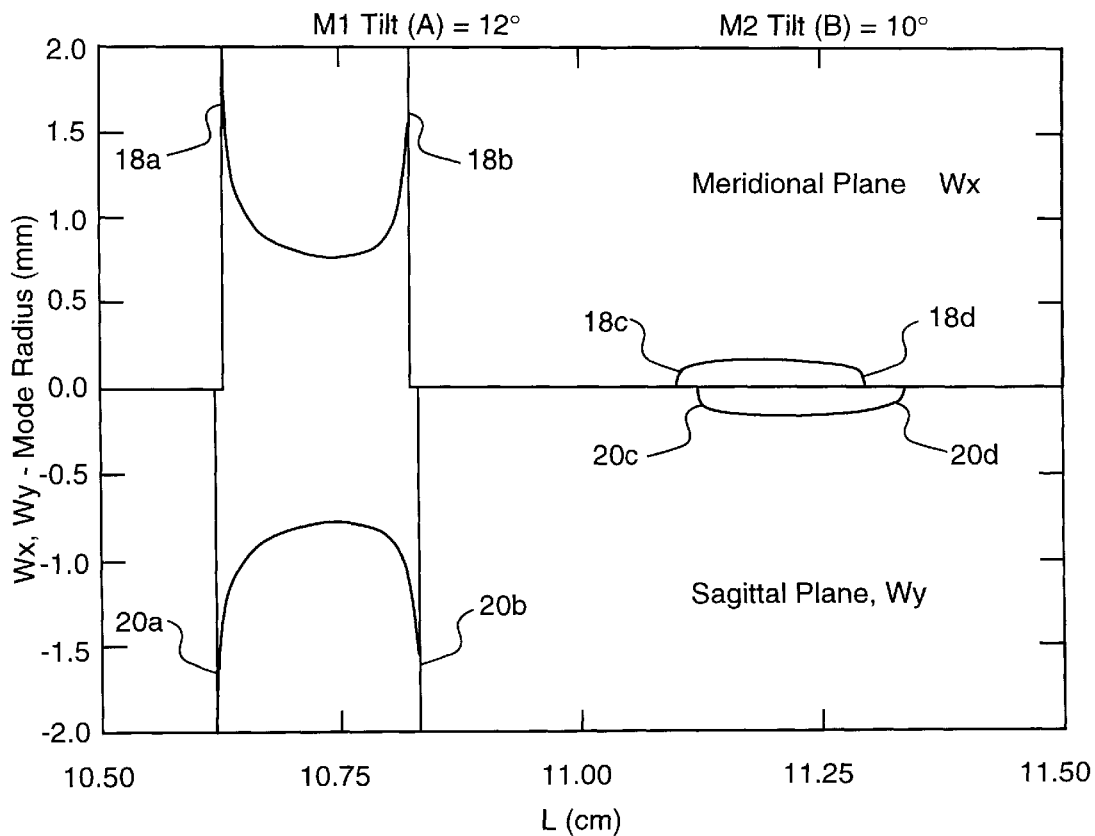
FIG. 2 is a plot of output mode radii versus separation spacing between the two optical elements of FIG. 1, obtained by a simulation for exemplary values of tilt.

FIG. 2 is an analytical graph of the output mode radii Wx and Wy at output coupler M3 versus the separation spacing L of the two optics M1 and M2 at tilt angles A=12° and B=10°. The curves above and below the horizontal (zero) axis represent the mode radii for the tangential or meridional (X) and sagittal (Y) directions respectively. The negative ordinate is merely for plotting convenience, with the values of Wy nevertheless being positive. The laser cavity is unstable anywhere the mode radius diverges to infinity or converges to zero (in either the X or Y directions). FIG. 2 predicts that cavity 10 (FIG. 1) will behave as follows:

if L<10.63 cm, the cavity is unstable;
if L>10.63 and L<10.83 cm, the cavity is stable;
if L>10.83 and L<11.10 cm, the cavity is unstable; and
if L>11.12 and L<11.28 cm, the cavity is stable.

Thus two separate branches yield a stable cavity output mode, the "left" branch (L>10.63 and L<10.83 cm) and the "right" branch (L>11.12 and L<11.28 cm). The two branches are a consequence of the unsymmetrical optical path shown in FIG. 1 (where L1 is not equal to L2) from crystal 12 to high reflection mirror M4 and output mirror M3. The output laser mode will be symmetrical since the X and Y modes have the same value except for values of L very close to the stability endpoints.

FIG. 2 is a graph of a data set which illustrates the tangential and sagittal mode radii Wx, Wy over an exemplary range of the separation spacing L of the focusing mirrors shown in FIG. 1, at specific values of tilt angle A, B. The data are conventionally generated for the specific configuration of laser resonator 10, but are displayed in a new form in accordance with a feature of the invention as illustrated in FIG. 2. In this way, a direct comparison of the resonator operating stability may be made for the two mode radii Wx, Wy.

As indicated above, two stable regions of operation are observed in the left and right branches illustrated in FIG. 2, wherein the resonator may operate with stability, but with different local operation. In particular, operation in the left branch stability region includes two stability endpoints 18a,b at which the tangential mode radius Wx is driven to infinity, with the right branch having two stability endpoints 18c,d wherein the tangential mode radius converges to zero. Similarly, the sagittal mode radius Wy diverges to infinity at the two stability endpoints 20a,b for the left branch, and converges to zero at the two stability endpoints 20c,d for the right branch.

Figure 3:
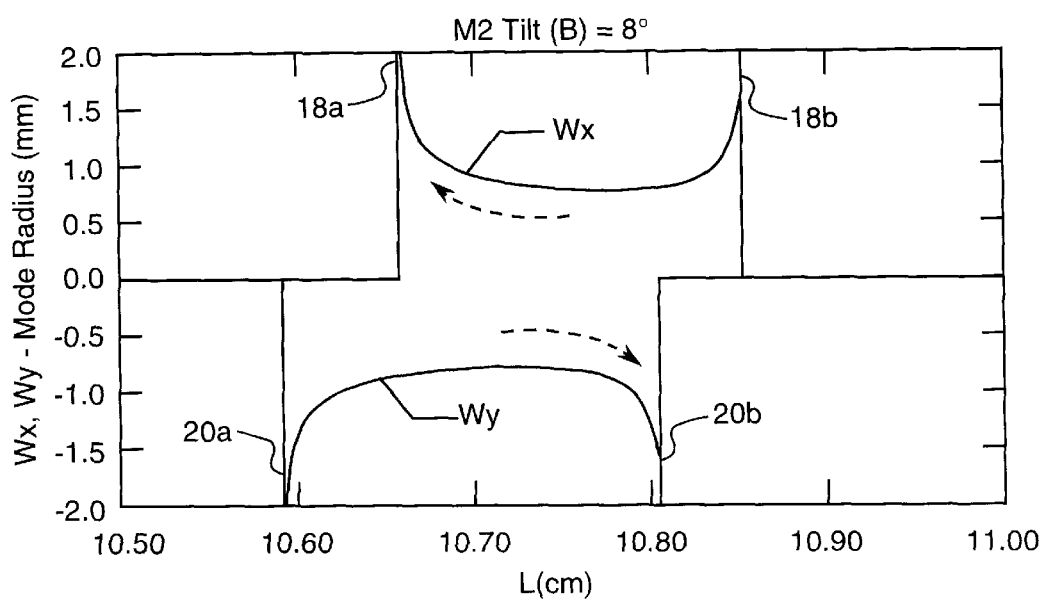
FIG. 3 is a graph similar to FIG. 2 at a smaller angle of tilt for the second element, obtained by a simulation.
Figure 4:
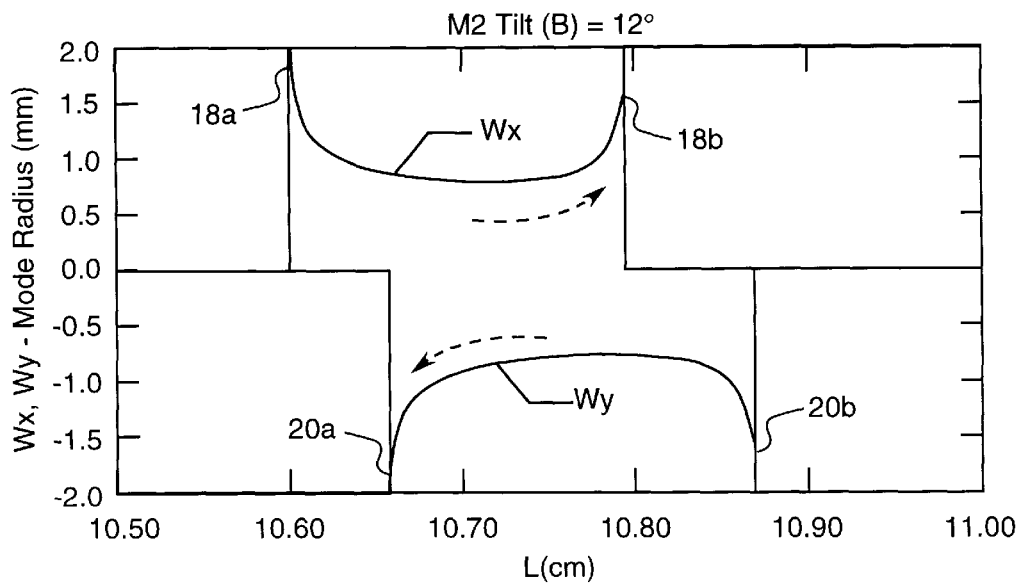
FIG. 4 is a graph similar to FIG. 2 at a larger angle of tilt for the second optical element, obtained by a simulation.

FIGS. 3 and 4 are additional data sets in the form of graphs at respectively different values of the tilt angle B for the second mirror M2 of FIG. 1, with the first mirror M1 remaining at a tilt angle A of 12°. The range of mirror separation spacing L illustrated in FIGS. 3 and 4 is displayed for the left stability region, with the corresponding right stability regions not being shown in these views. In FIG. 3, the analyzed tilt angle B is too small for optimum stability over an extended range of separation spacing L, and in FIG. 4, the tilt angle B is too large for optimum stable operation over an extended range of the spacing L.

The simulation predicts that as the tilt angle B of mirror M2 is changed, the stability region for the laser mode in the X plane shifts with respect to that for the Y plane. If the two stability regions do not adequately overlap, the output laser mode will almost always be elongated or unsymmetrical. Furthermore, if the tilt angle error is too large, the X mode will not be stable when the Y mode is stable (or vice versa), and consequently laser oscillations will cease altogether.

FIGS. 3 and 4 analytically predict behavior of the output mode at the coupler M3 when the tilt angle B of mirror M2 is too small, e.g. 8°, or too large, e.g. 12°. They show that the stability of the X and Y modes shift with respect to each other. The consequences of the behavior are as follows:
1. The stability overlap range (for the X and Y modes) is reduced.
2. For most values of L, the mode will be asymmetric, and will have a different radius in the X and Y directions.
3. The laser mode near the stability endpoints will become very elongated in the X or Y direction depending on the tilt angle of mirror M2 and whether it is too large or too small.

This third consequence forms the basis of one feature of the present invention. That is, by observing the laser mode (or output mode) near the instability point, the sign of the error in the tilt angle can be inferred by noticing whether the mode becomes elongated in the X direction or the Y direction. For example, when the tilt angle of mirror M2 is too large, as shown in FIG. 4, the graph predicts that as L approaches 10.66 cm from larger values, as shown by the dashed arrow, the mode will become increasingly elongated in the Y direction, or, when L approaches 10.78 cm from smaller values, as shown by the dashed arrow, the output mode will become elongated in the X direction. The reverse is true if the tilt angle of mirror M2 is too small, as shown in FIG. 3. Consequently, explicit information about the relative tilt angle error can be deduced by observing whether the laser mode near the cavity instability points becomes elongated in the X or Y direction before going unstable. When the mirror M2 is tilted optimally, the mode will stay symmetric over the total predetermined range of L shown in FIG. 2.

Figure 5:
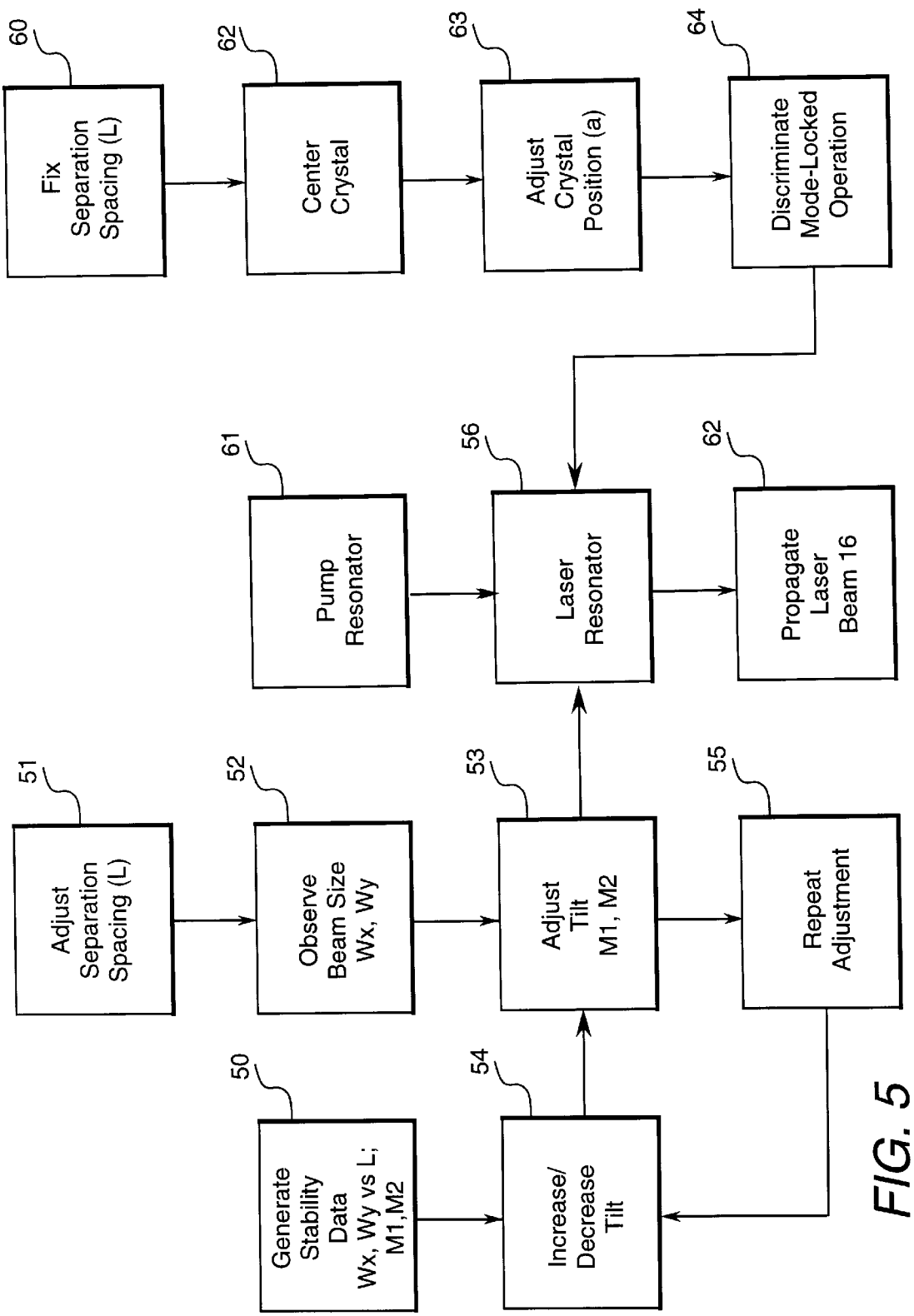
FIG. 5 is a flowchart showing an exemplary method of adjusting optical alignment of a laser resonator such as that illustrated in FIG. 1.

An improved method of alignment in accordance with one embodiment of the invention is illustrated schematically in flowchart form in FIG. 5. Laser resonator 56 is initially configured for operation at step 50, with pump resonator 61 optically pumping laser medium 12 of FIG. 1 to produce laser beam 16 at step 62. The separation spacing L between first and second mirrors M1, M2 is then conventionally manually adjusted at step 51, and the size or radius of laser beam 16 is observed or measured at step 52. Based on the exemplary graphs of FIGS. 3 and 4, tilt of at least one of mirrors M1, M2 may then be conventionally adjusted at step 53 in response to any observed change in the beam size.

The beam size is preferably observed at step 52 as a cross-sectional size in first and second orthogonal directions X, Y for detecting an increase or decrease thereof, with the tilt of the one mirror being suitably adjusted either smaller or larger at step 54 in response to the observed beam size change.

The preferred adjustment of tilt may be determined by observing the mode radii as the separation spacing L is changed at step 60. As the spacing decreases, an increase in tilt angle B is required upon an observed increase in the beam size mode radius Wx in the X or first direction. Conversely, a decrease in tilt angle B is required upon observing an increase in beam size mode radius Wy in the Y or second direction.

Alternatively, the required change in tilt of the second mirror M2 may be determined upon increasing the separation spacing L and observing beam size. An increase in tilt angle B is required upon observing an increase in beam size mode radius Wy in the second direction Y. Conversely, a decrease tilt angle B is required upon observing an increase in beam size mode radius Wx in the first direction X.

Although this method is practiced in an example for a fixed tilt of the first mirror M1 at the exemplary tilt angle A=12°, and a change in tilt of the second mirror M2, the same method applies with a fixed tilt of second mirror M2 and a corresponding change in tilt of first mirror M1. Since both mirrors M1, M2 affect performance of the resonator, tilting adjustments may be made in either mirror, or both if desired. As a practical matter, adjustment of only one of the two mirrors is required and is simpler to effect.

By repeating, as indicated at step 55, the steps of adjusting the separation spacing L, observing the beam size, and adjusting the tilt of second mirror M2, a value of separation spacing L at which further changes thereto effect substantially equal changes in the beam size in both the first and second (X, Y) directions simultaneously will be obtained, which correspond with the optimum performance illustrated in FIG. 2. In the left branch illustrated in FIG. 2, first and second mirrors M1, M2 may have respective tilt angles A=12° and B=10° over an extended range of stable operation between the stability endpoints 18a,b and 20a,b.

This improved method of adjusting tilt of mirrors M1, M2 can be used to align and optimize all resonators or cavities with tilted element components. Any laser cavity incorporating tilted elements can benefit from this alignment method if a $TEM_{00}$ output mode is desired. The method may be used to greatly improve reliability and performance of all research and commercial lasers, and may also be used to simplify the alignment procedure while tuning up any laser system incorporating tilted optical elements.

The basic resonator configuration illustrated in FIG. 1 may be found in various types of laser systems, all of which may benefit from the improved optical alignment process described above. For example, laser resonators may be operated in the continuous wave (cw) mode, or in pulsed operating modes including mode-locked or Q-switched, or both. A mode-locked laser resonator is used for operating a laser system with suitably small duration laser pulses. As the laser pulse durations decrease, the complexity or sophistication of the required laser system typically increases, the number of required optical elements increases, and the difficulty of obtaining effective optical alignment among the several components also increases. Furthermore, the laser resonator must include suitable means for discriminating or effecting either the cw or mode-locked operation.

The nonlinear optical response (including the intensity-dependent refractive index) of virtually all optical materials, including laser crystals, active and passive optics for beam forming, and optical phase modulation, is explicitly dependent upon the instantaneous intensity and frequency content of the incident laser radiation due to the complex optomechanical origin of the nonlinearity. The nonlinear optical response may consist of a set of nominally independent contributions, originating in distinct properties of the material. Furthermore, the temporal range over which the nonlinear optical response is operative depends explicitly upon the opto-mechanical origin of the response, and can range from essentially instantaneous (i.e., femtoseconds) to seconds for nonresonant electronic to thermal transport origins, respectively.

Many techniques have been implemented in order to simulate the behavior of laser crystal nonlinearities. Most of them are based on the conventional quadratic duct method, and do not treat specifically the case of noncircular, elliptical beams.

Recently it has been shown that beam ellipticity leads to nonlinear coupling between the two orthogonal mode radii and significantly alters their characteristics. The present invention extends this analysis, where the nonlinear medium is treated as being divided into segments each having a thickness d. The mode is then propagated through each segment using the matrix elements:

$$M_i = \sqrt{1-\gamma_i} \begin{bmatrix} 1 & d/n_o \\ -n_o\gamma_i/d(1-\gamma_i) & 1 \end{bmatrix} \quad (1)$$

$i = x, y$ where:

$\gamma_x = (r(z)P/P_{crit})/\left[1 + (n_o\pi w_{1x}^2/d\lambda_o)^2(1 + d/R_{1x})^2\right]$ $\gamma_y = (P/P_{crit}r(z))/\left[1 + (n_o\pi w_{1y}^2/d\lambda_o)^2(1 + d/R_{1y})^2\right]$ $r(z) = w_x(z)/w_y(z)$ and:

$$P_{crit} = k\frac{\lambda_o^2}{8\pi n_o n_2} \text{(critical power for self-focusing)}$$

The parameter $\lambda_0$ (800 nm) is the vacuum wavelength of the laser mode, $n_0$ and $n_2$ are the linear and nonlinear refractive indices (1.76 and $3\times10^{-16}$ cm$^2$/watt for Ti:Al$_2$O$_3$, respectively), and P is the instantaneous power of the propagated laser beam. The parameter $P_{crit}$ defines the value of the instantaneous laser power at which a planar wavefront will propagate through a nonlinear material with zero transverse divergence. The value k in $P_{crit}$ represents a correction factor that accounts for the fact that the quadratic approximation for the mode intensity profile (about the origin) overestimates the nonlinear effect by an amount approximately equal to the value of k. For this analysis, k=4 was assumed. The parameters $w_{1i}$, and $R_{1i}$ represent the mode radius and wavefront radius of curvature in the two orthogonal planes (i=x,y) at the entrance face of each segment.

Figure 6:
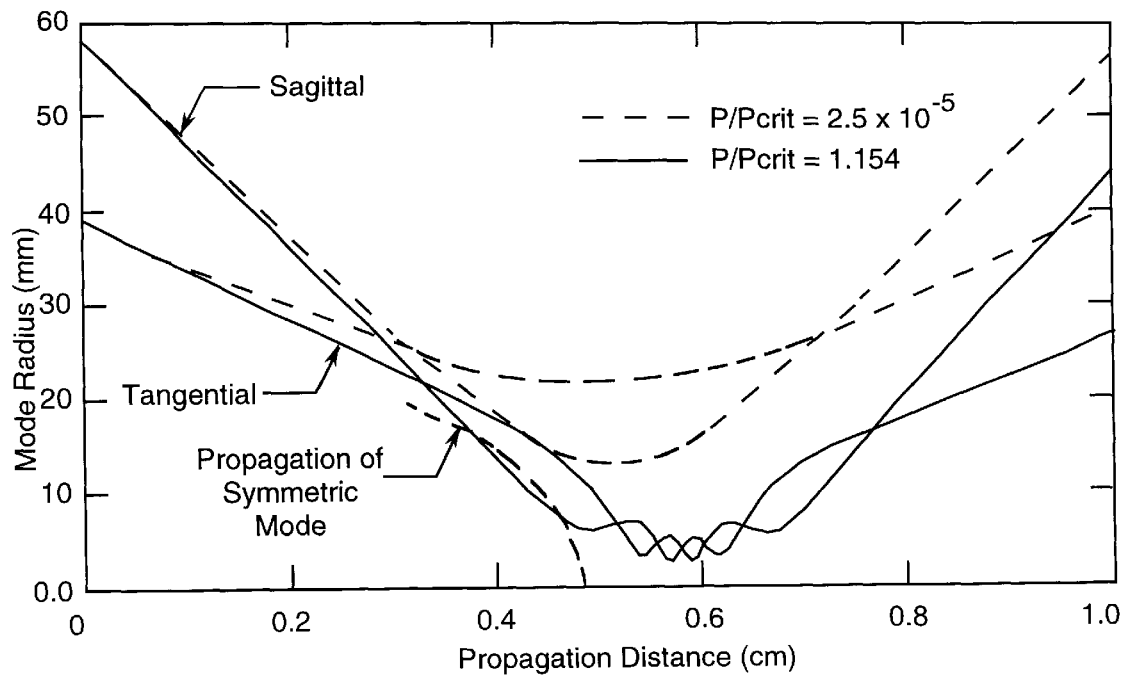
FIG. 6 is a graph of mode radius versus propagation distance for the propagation of an elliptical transverse mode in a Ti:Al$_2$O$_3$ crystal in continuous wave and mode-locked format.

FIG. 6 summarizes the propagation of the cw (dashed line) and mode-locked (solid line) formats of the elliptical transverse laser mode through a Ti:Al$_2$O$_3$ crystal in the sagittal and tangential planes, corresponding to $P/P_{crit}$ values $2.5\times10^{-5}$ and 1.154, respectively, when the nonlinear refractive index is included (the effect of the pump beam on the propagation, however, is not included). The oscillatory behavior near the focus in the mode-locked format is a direct result of the nonlinear coupling between the unequal orthogonal mode radii.

The matrix $M_i$ in equation (1) can also be used to propagate a symmetric transverse mode through a nonlinear material. In that case, the beam exhibits catastrophic self-focusing and collapses to the axis for $P/P_{crit}>1$, as shown by the dotted line in FIG. 6. This is a behavior that is often predicted by non-coupled approximations. For $P/P_{crit}<1$, it can be shown that the symmetric mode propagates through the laser crystal with a finite mode radius, resulting in a stable nonlinear focal power in the laser crystal.

The dramatic difference between the behavior of the symmetric and coupled asymmetric mode predictions has important implications for the design of a laser with a symmetric mode propagating in the nonlinear (laser) crystal when $P/P_{crit} \geq 1$. In typical solid-state lasers, an elliptical mode passes through the laser crystal as a consequence of the aberration correction needed to operate the crystal at Brewster's angle (for zero insertion loss). However, it appears that this ellipticity is also a necessary condition for stable propagation of the TEM$_{00}$ mode when the laser is mode-locked. A mode that was symmetric in the nonlinear (laser) crystal would not be stable and would not achieve a steady-state output condition in the mode-locked format when $P/P_{crit}>1$ while, in the cw format, the symmetric TEM$_{00}$ would be stable at virtually all output powers, and hence favored over the mode-locked format. For $P/P_{crit} \leq 1$, it can be shown that the nonlinear focal power of the laser crystal for the cases of circularly symmetric and elliptical transverse modes differs substantially, resulting in unique stability loci with unique temporal formats.

As noted above, the stimulation shown in FIG. 1 does not include the effect of the pump laser beam on the nonlinear refractive index of the laser crystal. When the operative optical nonlinearity resides in the laser crystal, the nonlinear focal power of the laser crystal is also modulated by the pump laser beam when the transverse pump laser mode is approximately matched to the transverse mode of the oscillating laser (i.e. the laser crystal is longitudinally pumped). This modulation is effected through:

i) the temperature gradients (thermal lens) arising from the "quantum defect" (the energy released by the relaxation of the energy level populated by absorption of a pump photon into the metastable "upper" energy level of the lasing transition) and the transverse distribution of absorbed pump photons, and ii) the nonresonant electronic and weakly resonant vibrational Raman and Brillouin contributions to the nonlinear refractive index (the Kerr lens).

The thermal lens i) contributes a steady state focal power to the laser crystal because the pump repetition frequency is much higher than the thermal relaxation rate, while the Kerr lens ii) gives rise to an instantaneous focal power which follows the temporal profile of the pump source.

The superposition of effects of the pump laser beam and the oscillating laser beam on the focal power of the laser crystal through the intensity dependent refractive index will have transverse mode stability consequences similar to the those shown in FIG. 6. The relative contributions of the pump laser beam and the oscillating laser beam to the net nonlinear focal power of the laser crystal can be adjusted by variation of:

a) the pump laser pulse duration, b) the instantaneous power of the oscillating laser through the resonator output coupling or the net group velocity dispersion, and c) the symmetries of each beam in the laser crystal, for example.

Thus the nonlinear focal powers of the laser crystal which select a unique temporal format of the laser output can be defined by unique, non-overlapping, ranges of parameters such as the above factors a, b and c.

It is conventionally known to use an intracavity optical nonlinearity resulting in an intensity dependent focal power in the nonlinear element to discriminate between cw and mode-locked formats of a stable transverse mode through changes in the net gain or loss experienced by the transverse mode due to differences of focal power in each temporal format. In the present invention, the transverse mode stability may be used as a primary discriminant between competing cw, Q-switched, and mode-locked output formats in a cw-pumped solid-state laser due to constraints on the formation of a stable focal power in the nonlinear element as a function of 1) the ratio $P/P_{crit}$ (where P is the instantaneous power and $P_{crit}$ the critical self-focusing power) and 2) transverse mode asymmetry of the applied laser beam(s). In the case of synchronous pumping, criteria are disclosed below for the nonlinear focal power of the laser crystal which discriminate between passive and forced mode-locking of the laser output for laser gain media in which the gain lifetime is much longer than round-trip time of the resonator. This invention further differs from conventional methods by identification and inclusion of nonlinear effects due to the asymmetry and instantaneous power of the pump laser transverse mode, and the method of achieving unique temporal formats in the laser output by superposition of the user-independently variable contributions to a stable nonlinear focal power in the laser crystal from the pump and oscillating laser beams.

The methods described herein may be used to design laser resonators and laser oscillator-amplifier systems which will operate with unique temporal formats of the laser output energy with specific transverse mode characteristics that are determined by the coupling of the transverse symmetry and instantaneous power of the pump and oscillating laser beams in the laser crystal. In the cases of tunable laser crystals such as $Ti:Al_2O_3$, $Cr^{3+}$ and $Cr^{4+}$ materials, which exhibit multiple temporal output formats at a constant transverse mode quality, the laser resonator can be designed to operate with a desired temporal format.

In the particular case of synchronous pumping of $Ti:Al_2O_3$, $Cr^{3+}$ and $Cr^{4+}$ laser crystals, unique superpositions of nonlinear focal power due to the oscillating and pump laser beams, and the parameters of beam asymmetries and $P/P_{crit}$, can be determined which will discriminate between passive and forced mode-locked operating formats, as well as between the mode-locked and cw formats. In the case of high power $Nd^{3+}$ oscillator-amplifier systems, constraints on temporal formats of the oscillator can be imposed via the resonator design which recognize limitations on the instantaneous power in the amplifiers necessary to avoid catastrophic damage to the laser crystals.

Recently commercialized mode-locked Ti:sapphire lasers, as well as developmental $Cr^{3+}$ and $Cr^{4+}$ crystal devices, represent major advances in access to broadly tunable ultrashort pulse lasers for diverse applications in laser sensors and spectroscopy. However, the dependence of commercially available Ti:sapphire systems on 5 watt or greater Ar+ pump lasers remains a substantial liability due to their high initial and maintenance costs, and the purely passive modelocking of these devices can result in the loss of mode-locked operation due to brief interruptions of lasing. Furthermore, the temporal operating mode and mode-locking mechanisms of the so-called Kerr-lens-modelocked (KLM) devices remain incompletely understood and the subject of active research.

This situation can result in, and has resulted in, significant confinement of ultrafast lasers and spectroscopy to a subset of the research community possessing advanced skills in laser physics and spectroscopy. The high profile university and vendor research programs still focus on pulse duration as the only relevant performance figure of merit. For example, state-of-the-art Ar+ pumped femtosecond Ti:sapphire lasers operating at $\leq 20$ femtosecond pulse durations show a typical optical-to-optical efficiency of $\leq 10\%$, and synchronously-pumped devices are even less efficient.

The design and optimization program for a Ti:sapphire laser system within the present invention has focused on mode quality and perturbational stability rather than simple pulse duration, and has achieved 20% (optical) pump conversion at 35–40 femtosecond pulse durations (in a regime where the Ti:sapphire crystal length is twice (2×) that used by competing programs, and is the primary limitation on pulse duration). Design criteria that enable "turn-key" operation in the mode-locked Ti:Sapphire laser systems have been identified. These design criteria are generic to laser oscillators that include optical elements with a significant nonlinear refractive index.

Figure 7:
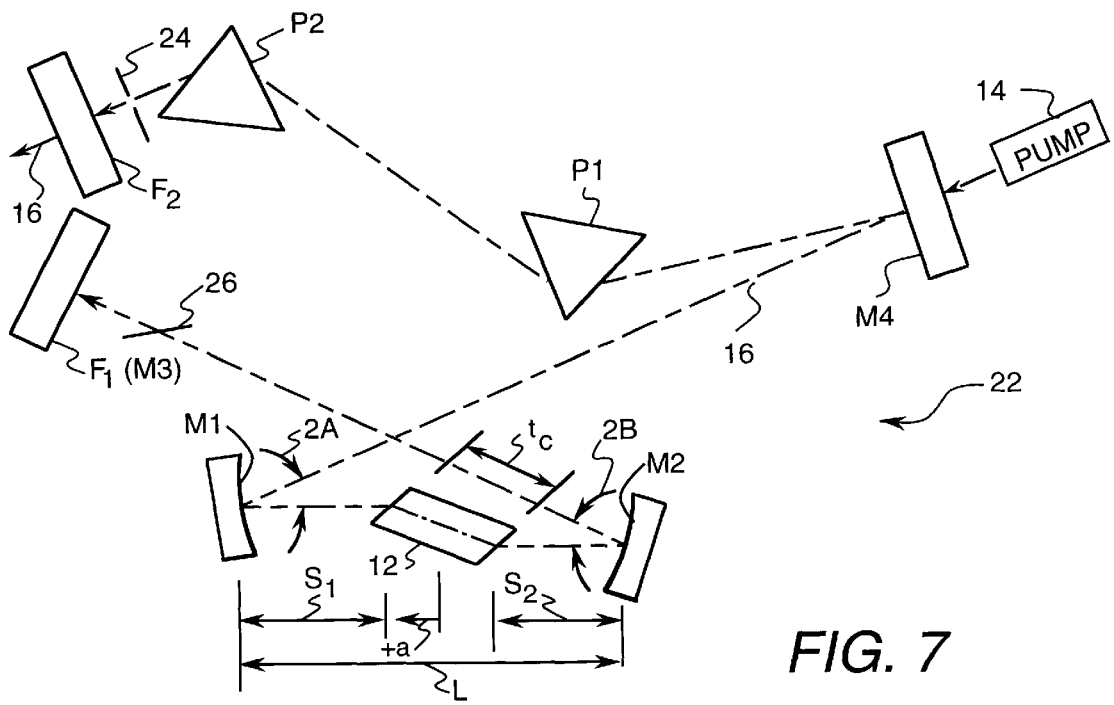
FIG. 7 is a schematic representation of a laser resonator in accordance with another embodiment of the present invention having two focusing mirrors bounding a laser crystal.

A prototype Ti:sapphire laser resonator 22, illustrated in FIG. 7, has been developed and is pumped by 5 watts at 532 nanometers from a frequency doubled, A/O mode-locked, Nd:YAG laser 14 pumped by cw arc lamps. The current performance of the Ti:sapphire device consists of user-determined mode-locked pulse durations between 25 femtoseconds and several tens of picoseconds, tunable between 680 and 1050 nanometers, at a maximum average power of $\geq 1$ watt at 800 nanometers in the $TEM_{00}$ spatial mode. The problems of instability in the Ti:sapphire output energy due to beam pointing instability in the Nd:YAG pump laser, and low optical conversion efficiency, have been resolved by the improved understandings disclosed herein, of mode propagation, mode stability, and perturbational mode convergence in laser resonators containing a self-focusing element. Similarly, the issues of alignment stability and ease of maintenance for intracavity peak powers near and exceeding the critical self-focusing power have been overcome.

An extension of previously developed simulational capabilities by the inventors has shown that, in laser resonators containing optical elements exhibiting significant self-focusing (including Ti:sapphire and the $Cr^{3+}$ and $Cr^{4+}$ crystals), unique spatio-temporal output formats require unique resonator configurations to satisfy the constraints of mode stability (i.e. lasing) and perturbational mode convergence (stability of the laser beam spatial intensity distribution). Case studies by the inventors on the parametric dependence of the resonator configuration on the laser crystal optical properties have identified a way of discriminating between competing pulse formats in the laser output energy in accordance with another feature of the present invention.

This thesis is far more general than the simple gain-loss modulation constraint identified in the prior art on KLM lasers. Furthermore, design criteria based upon optical properties and dimensions of the laser crystal can be specifically established in order to accommodate system operation optimized for parameters other than minimum output pulse duration (such as pump conversion or nonlinear frequency conversion efficiency).

The exemplary laser resonator 22 illustrated schematically in FIG. 7 includes, in part, laser medium 12, first and second focusing mirrors M1, M2, a first reflector F1 which is highly reflective and replaces output coupler M3 of FIG. 1, reflector M4, and Nd:YAG laser pump 14 preferably optically aligned with reflector M4 for pumping laser medium 12. Laser resonator 22 is in a similar folded configuration and may be initially optically aligned as described above for obtaining the optimum tilt angles A, B of the first and second mirrors M1, M2, respectively. Laser medium 12 preferably comprises Ti:sapphire, which is a Kerr lens medium, having opposite end faces inclined at Brewster's angle.

Reflector F1 is optically aligned with second focusing mirror M2, and second reflector M4 is optically aligned with first focusing mirror M1. A pair of Schott glass Brewster prisms P1 and P2 are optically aligned with second reflector M4 in a conventional configuration for compensation of group velocity dispersion. A conventional output coupler F2 is optically aligned with the end prism P2. An iris or aperture 24 in the form of a variable slit is positioned between second prism P2 and output coupler F2, and a conventional tuning plate 26 of about 0.2 mm thick quartz is disposed between first reflector F1 and second focusing mirror M2. By pumping the laser resonator from second reflector M4, the resonator exhibits improved optical alignment and performance.

A synchronously-pumped femtosecond mode-locked Ti:sapphire laser resonator, such as illustrated in FIG. 7, was built and demonstrated several unique operating characteristics, including a high optical conversion efficiency and indications of synchronization of the tunable femtosecond pulse to the 100 picosecond pulse duration train. The experimental elements of that program were executed concurrently with a modified ray-transfer (ABCD) matrix simulation and analysis of the Ti:sapphire laser resonator shown in FIG. 7. These simulations allow identification of several unique aspects of the stability of Gaussian modes (i.e. whether the mode was supported by the resonator) in unsymmetrical resonators, which had not previously been documented. Resonator asymmetry refers to the unequal optical path lengths between the laser crystal and the flat resonator end mirrors F1 and F2. The first of these was the predicted Gaussian mode bistability of the unsymmetrical resonator as a function of the separation of curved mirrors M1 and M2, as shown in FIG. 8, which was subsequently verified by measurements of the laser mode intensity distribution as shown in FIG. 9.

Figure 8:
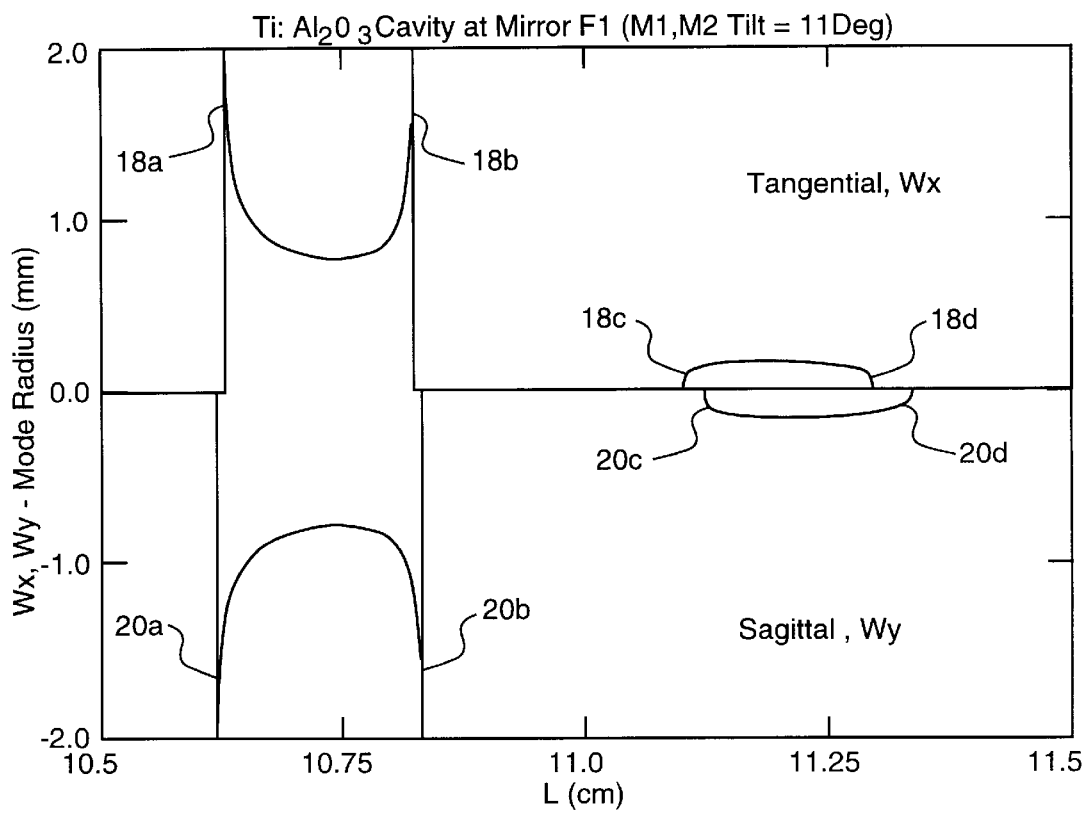
FIG. 8 is a graph of ABCD matrix simulation mode radii versus separation spacing between the two focusing mirrors illustrated in FIG. 7, which is substantially identical to FIG. 2, but for mirror tilt angles of 11°.

FIG. 8 is substantially identical to FIG. 3 in view of the commonality of the crystal 12 and first and second focusing mirrors F1 and F2. Crystal 12 is formed of titanium-sapphire (Ti:Al$_2$O$_3$), with first and second mirrors M1, M2 having the same tilt of A=B=11° which may be obtained by the improved alignment method described above. Like FIG. 3, FIG. 8 plots the stable and unstable regions of resonator 22 operation, which in the example illustrated experiences the left and right branches of stability as described above. The plotted mode radii Wx, Wy are for laser beam 16 at first reflector F1.

Figure 9:
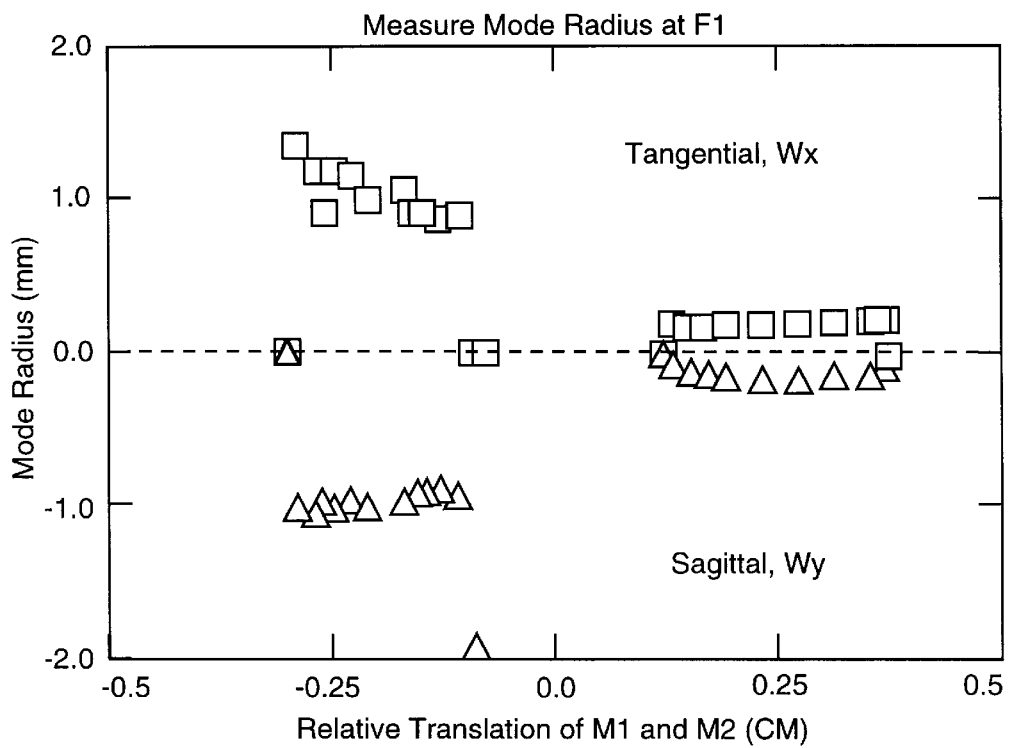
FIG. 9 is a graph of mode radii versus relative translation between the focusing mirrors of FIG. 7, presenting empirical data for verifying the ABCD matrix simulation graphed in FIG. 8.

FIG. 9 plots test data confirming the analytical data presented in FIG. 8, with the abscissa in FIG. 9 being based on translation of first and second focusing mirrors M1, M2 relative to a nominal center position designated 0.0, which is analogous to an 11.0 cm separation of the mirrors depicted in FIG. 8.

Figure 10:
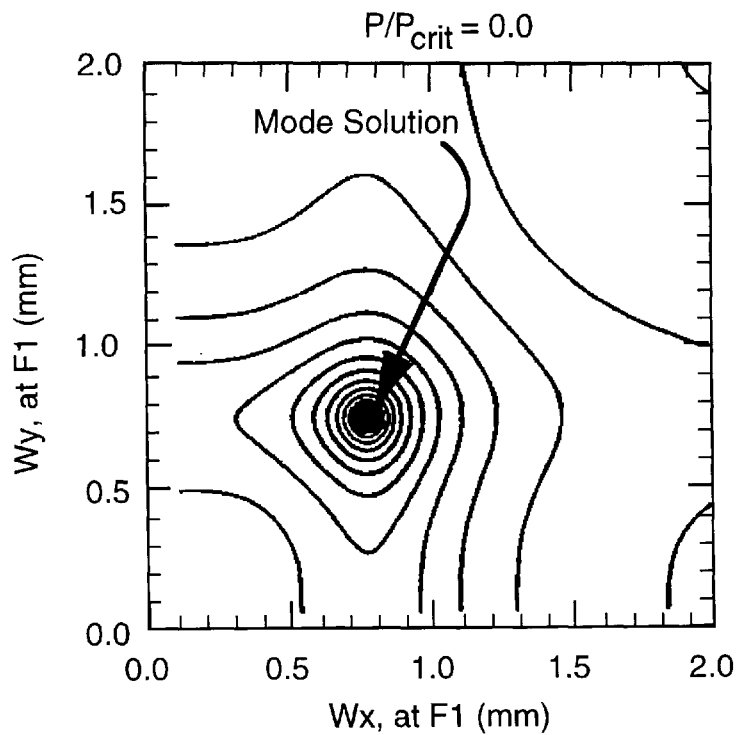
FIGS. 10–15 are a series of graphs of tangential and sagittal mode radii over a range of power ratios $P/P_{crit}$ including 0.0; 0.5; 0.6; 0.7; 0.9; and 1.0, respectively.
Figure 11:
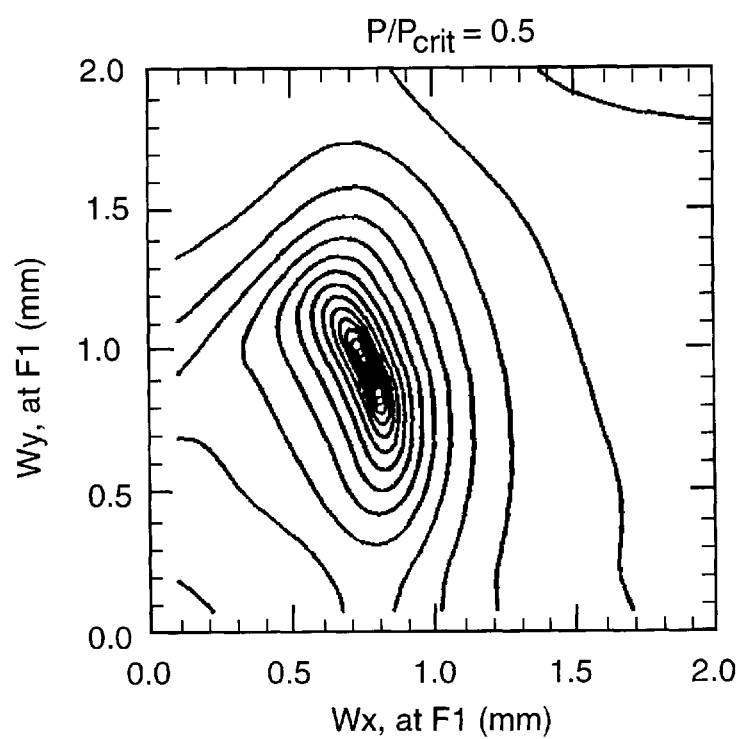
Figure 12:
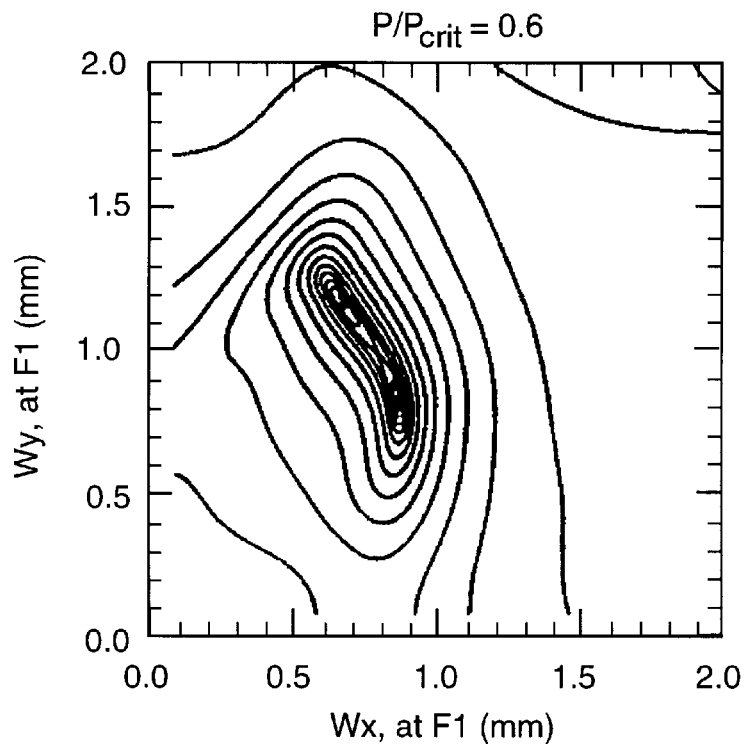

Application of the constraint of a plane wavefront at flat mirrors F1 and F2 in the ABCD matrix analysis resulted in a novel method for finding the lowest order Gaussian mode(s) of the resonator. If a collimated mode is launched from F1, after one round trip of the resonator, the mode at F1 must satisfy the equation:

$$C_x^2(Wx,Wy)+C_y^2(Wx,Wy)=0 \quad (2)$$

where the $C_{x,y}$ are the wavefront curvatures, and Wx, Wy are the mode radii in the planes perpendicular to (X) and containing (Y) the laser crystal Brewster angles. This approach offers the advantages that optimization algorithms are readily applied to the search for solutions to equation (2), and multiple solutions are quickly identified. For cw laser output energy, FIG. 10 shows the contours of $\log(C_x^2+C_y^2)$ at F1. The stable modes satisfy equation (2).

Inclusion of self-focusing into the ABCD formalism allows examination of the parametric dependence of the mode symmetry on the ratio $P/P_{crit}$, where P is the intracavity peak power of the circulating laser pulse, and $P_{crit}$ is the critical self focusing power of a material possessing a nonlinear refractive index $n_2$ (where diffractive beam expansion is exactly canceled by self focusing). While many conventional techniques have been implemented in order to simulate behavior of the crystal nonlinearity, most of them are based on the quadratic duct method and do not treat specifically the case of elliptical beams.

One conventional technique shows that this ellipticity leads to nonlinear coupling between the two orthogonal modes and significantly alters their characteristics. The conventional technique may be extended to where the nonlinear medium is divided into segments, each having a thickness d. The mode is then propagated through each segment using equation (1) as described above.

Similarly, the mode propagation may be calculated by numerical integration of the coupled, nonlinear wave equations using conventional adaptive Runge-Kutta methods.

If the matrix describing ray propagation through the nonlinear medium (the laser crystal) is included in the resonator round trip, the effects of the self-focusing nonlinearity in the laser crystal on the symmetry and radii of the stable mode(s) can be predicted. FIGS. 10 through 15 show the evolution of mode(s) supported by the resonator of FIG. 7 as a function of the temporal format of the laser output energy through the parameter $P/P_{crit}$.

Perturbational convergence of the laser mode(s) were studied by displacing the mode from the curvature minimum identified by the $\log(C_x^2+C_y^2)$ contours. Perturbationally stable modes re-establish themselves in a few round trips of the resonator. Perturbational mode stability varies as a function of the $P/P_{crit}$ power ratio of the temporal laser format. The perturbational stability has been experimentally verified, and is quite sensitive to alteration of the resonator by displacements of optical elements on the order of tenths of millimeters. This sensitivity is shown in FIGS. 16–23, where the position of laser crystal 12 between mirrors M1 and M2 (as shown in FIG. 7) is seen to determine ability of the laser mode (and through $P/P_{crit}$ the associated temporal format) to propagate with a constant spatial intensity distribution.

While FIGS. 10–15 show the mode solutions over an exemplary range of $P/P_{crit}$, FIGS. 16–23 present behavior at a specific value of the $P/P_{crit}$ power ratio. For example, the power ratio of 0.70 is represented in these Figures for examining performance of laser resonator 22.

As shown in FIG. 7, the intracavity position of crystal 12 in the optical path between first and second focusing mirrors M1, M2 may be identified by its relative displacement, designated by an intracavity centering or spacing parameter "a" from a center position between the mirrors represented by a=0. The first mirror M1 is spaced from the cooperating end face of crystal 12 by the optical distance $S_1$, and the second mirror M2 is spaced from the opposite end face of crystal 12 by the optical distance $S_2$. The optical path through crystal 12 is represented by the crystal thickness $t_c$, which is 1.0 cm for example. A nominal, or centering spacing for the first and second mirrors M1, M2 is designated $S_0$ and is equal to $(L-t_c)/2$. The first and second spacings $S_1$ and $S_2$ may be simply represented by the nominal spacing $S_0-a$ and $S_0+a$ respectively. The separation spacing L is therefore the sum of $S_1+t_c+S_2$.

FIGS. 16–23 can be used to evaluate performance of laser resonator 22 as a function of the $P/P_{crit}$ power ratio and various values of the spacing parameter (a). In this way, performance of resonator 22 may be evaluated relative to the longitudinal position of crystal 12 between first and second focusing mirrors M1, M2 at a constant value of separation spacing L and at a constant value of the power ratio.

Figure 13:
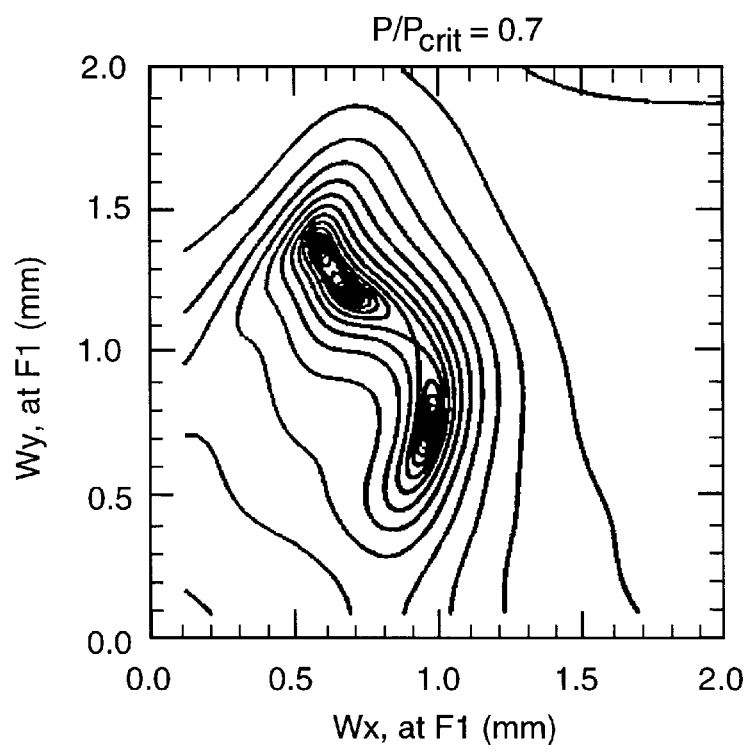
Figure 14:
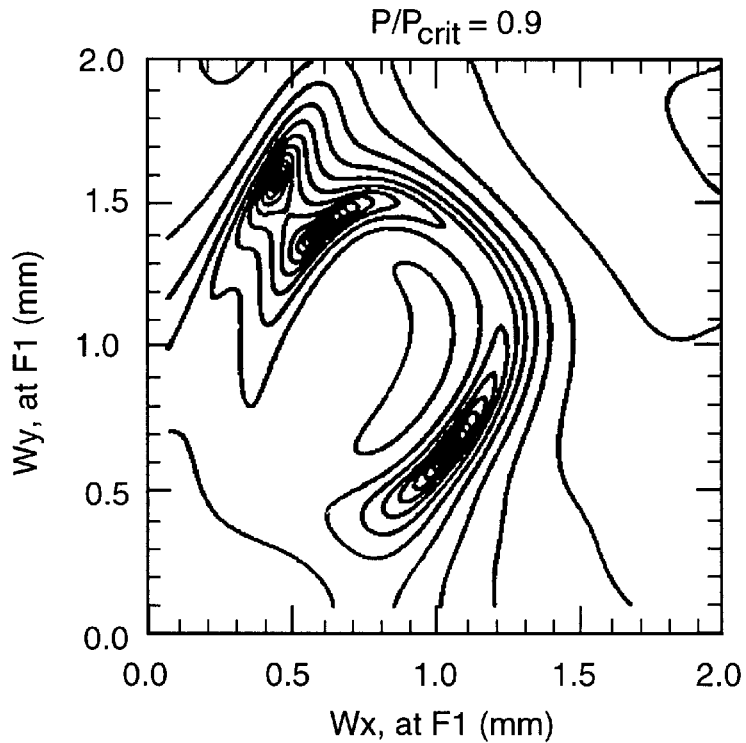
Figure 15:
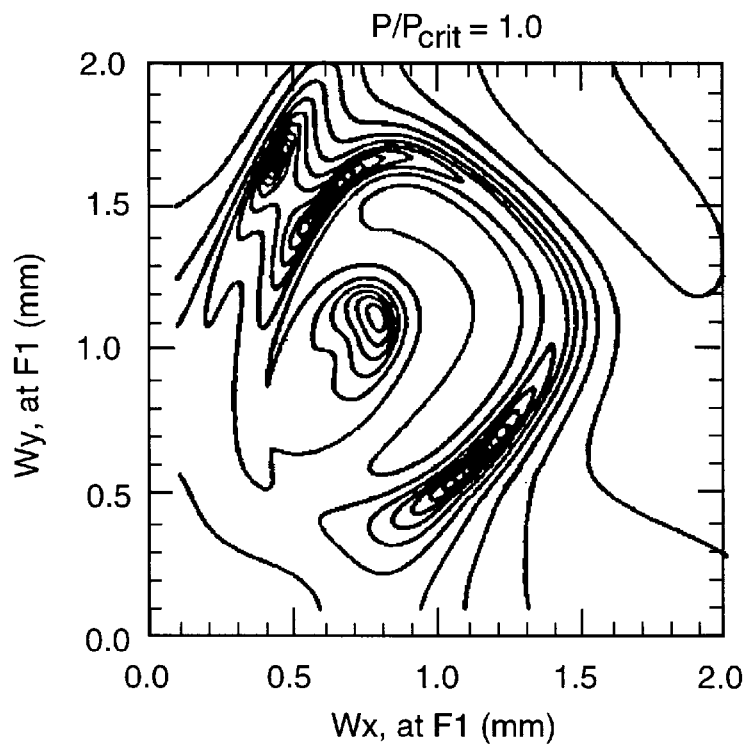
Figure 16:
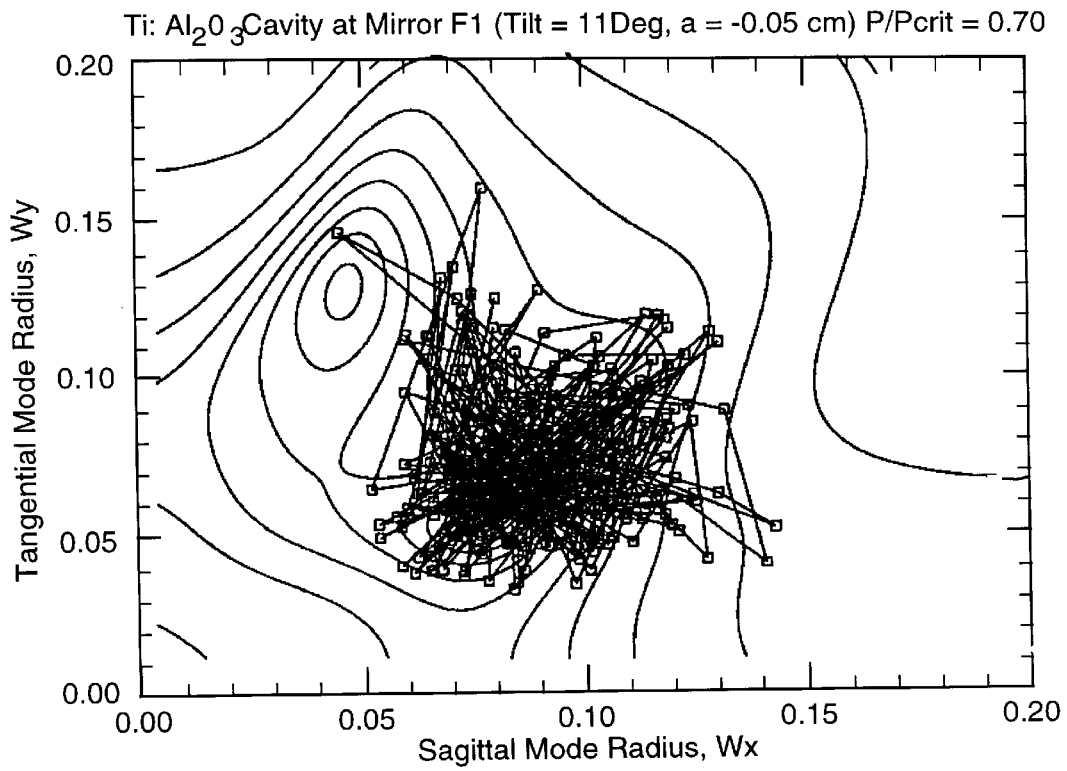
FIGS. 16, 18, 20, and 22 are graphs of tangential mode radius Wy versus sagittal mode radius Wx for a constant power ratio $P/P_{crit}$ of 0.70, for a spacing parameter a=−0.05 cm; −0.03 cm; +0.01 cm; and +0.05 cm, respectively.
Figure 17:
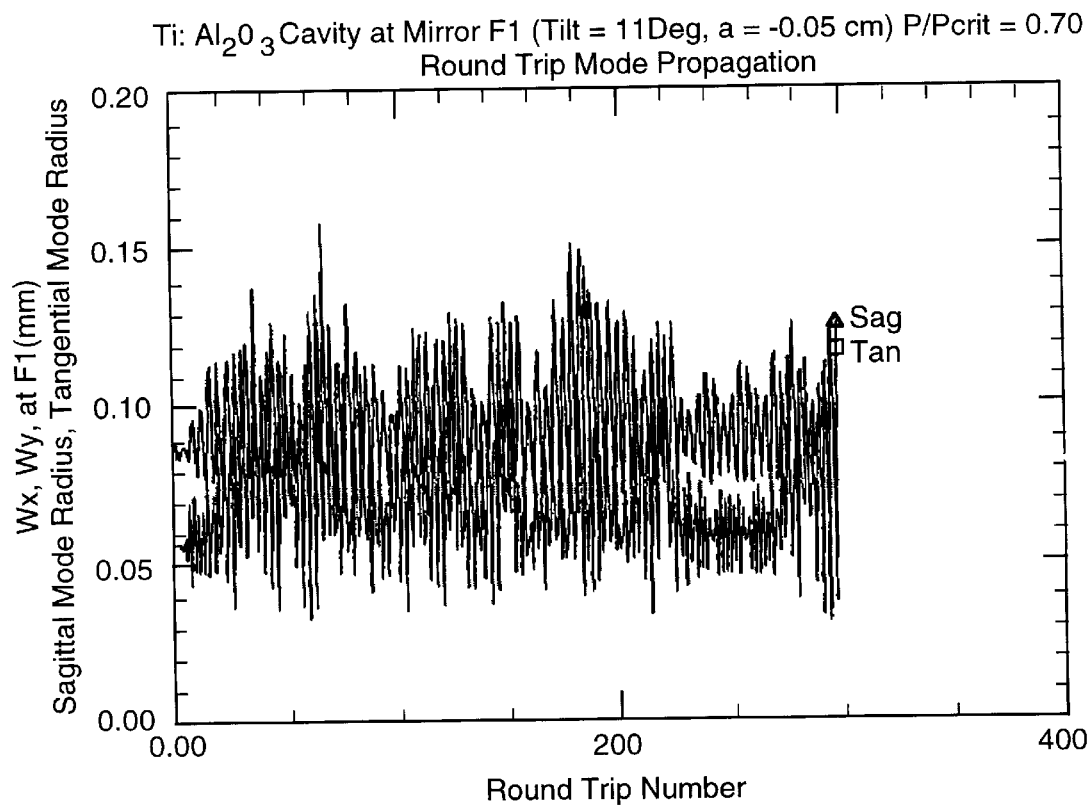
FIGS. 17, 19, 21, and 23 graphically illustrate sagittal and tangential mode radii versus round trip number corresponding with the parameters for FIGS. 16, 18, 20, and 22, respectively.

FIGS. 16, 18, 20, and 22 plot the mode solutions like those plotted in FIGS. 10–15, but at a specific power ratio, for example 0.7 like the contour plot illustrated in FIG. 13. This may be accomplished for any specific power ratio of interest for operating laser resonator 22.

FIGS. 17, 19, 21, and 23 plot the analytically determined sagittal and tangential mode radii Wx, Wy at first reflector F1 as a function of round trip number. For example, in FIG. 17, the oscillating performance of the mode radii, which are superimposed upon the corresponding mode solution in FIG. 16, can be seen. The substantial oscillation indicates unstable performance of resonator 22 at these operating parameters including a value of a=−0.05 cm.

Figure 18:
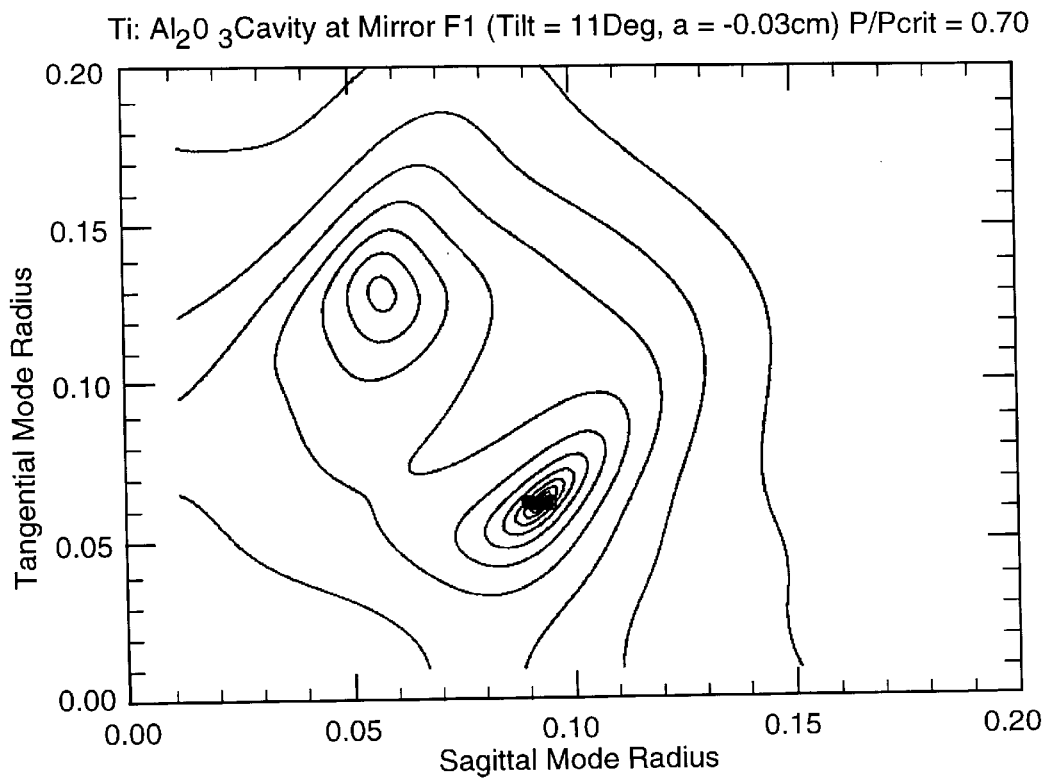
Figure 19:
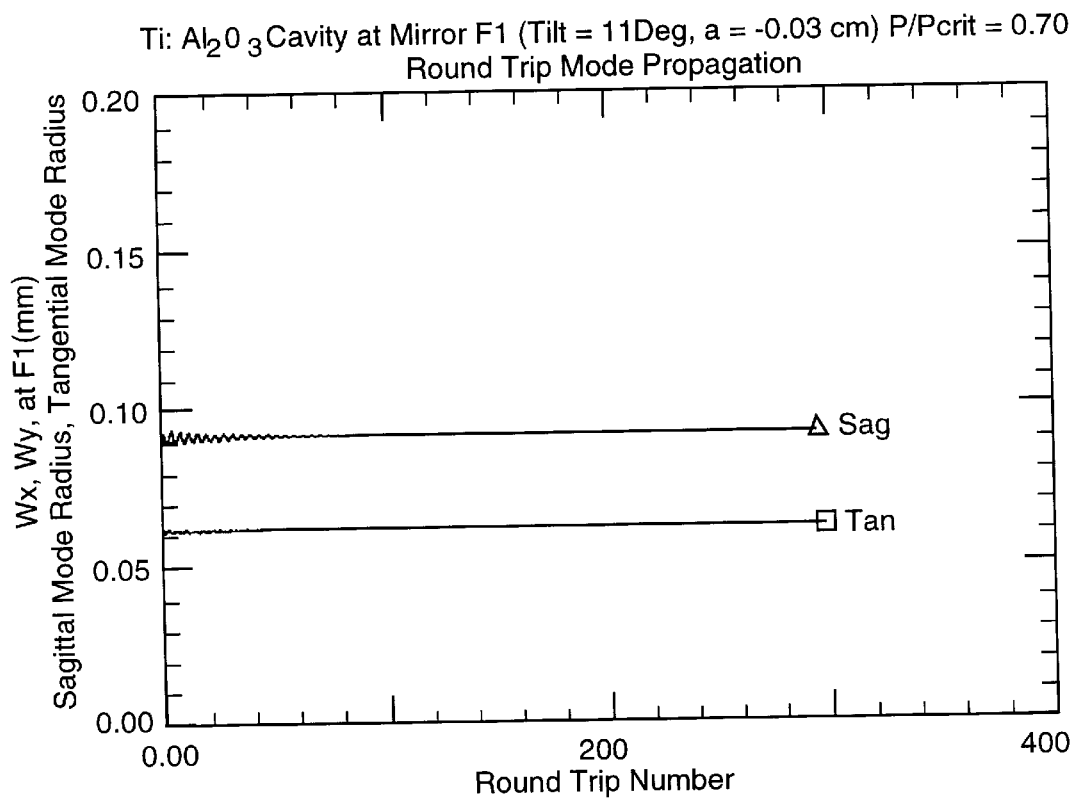

In the corresponding FIGS. 18 and 19, wherein a=−0.03 cm, the mode radii are shown to promptly stabilize to flat lines, indicating stable mode-locked performance of resonator 22.

Figure 20:
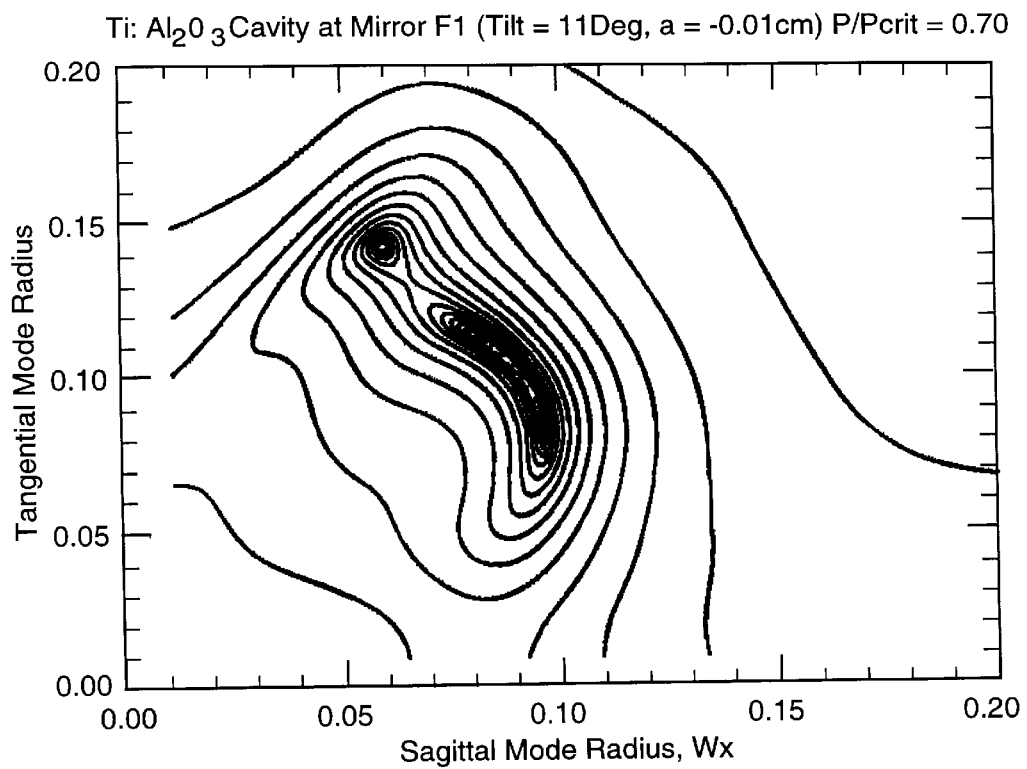
Figure 21:
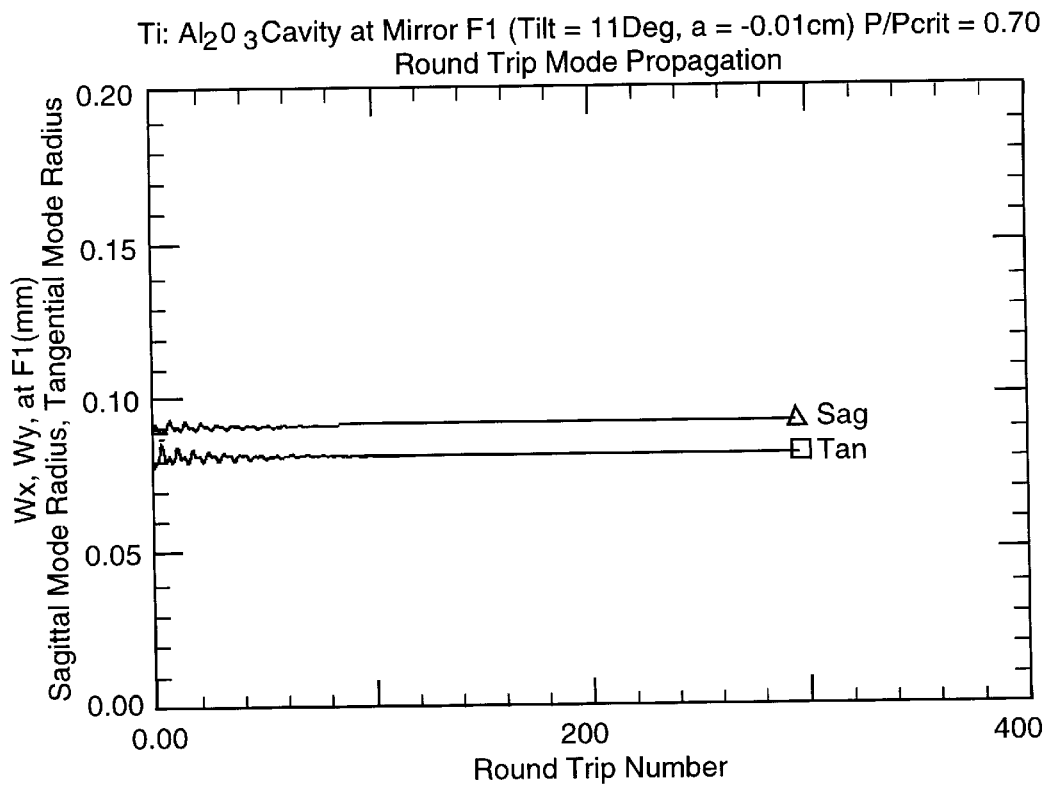

Similar stable performance is also illustrated in the corresponding FIGS. 20 and 21 wherein a=0.01 cm. FIGS. 18–21 support a preferred range of spacing parameter (a) at least between −0.03 cm and +0.01 cm at the power ratio of 0.70 for effecting stable mode-locked performance of resonator 22.

Figure 22:
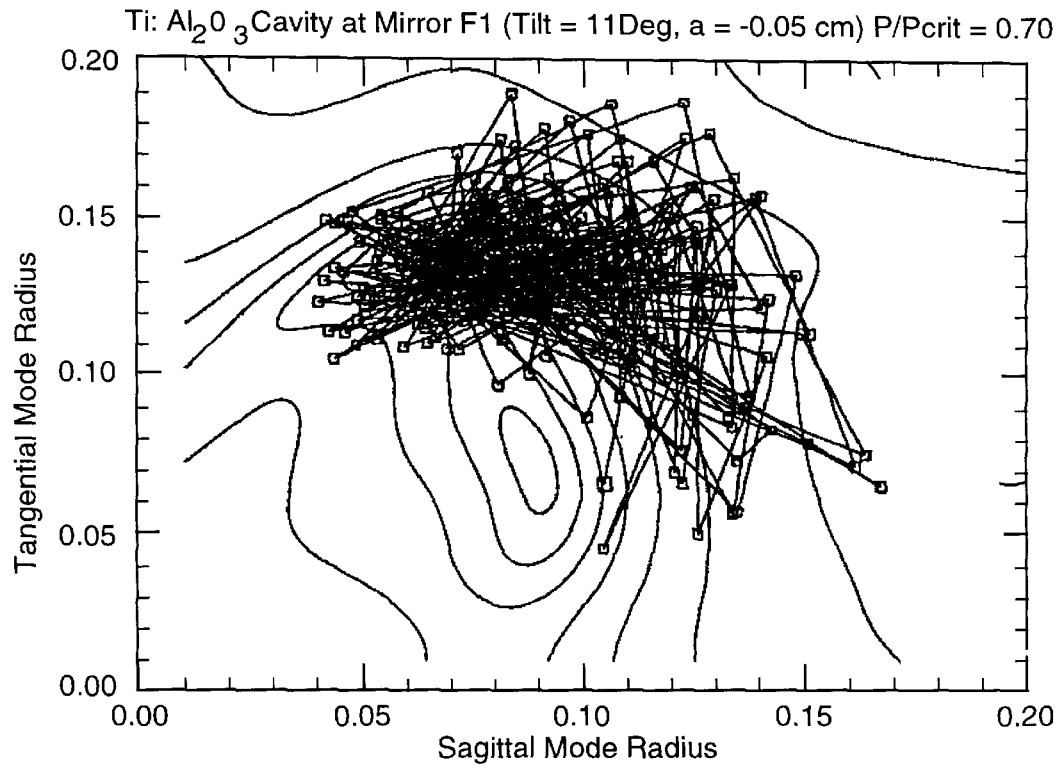
Figure 23:
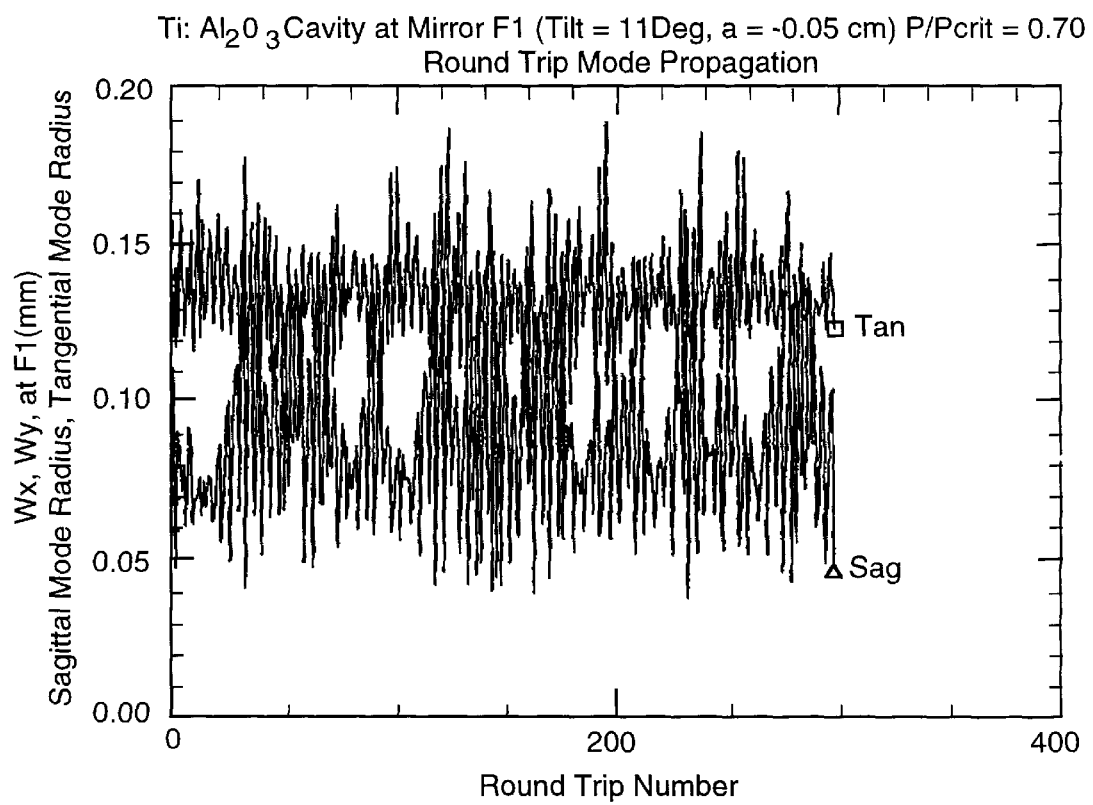

Corresponding FIGS. 22 and 23, wherein a=0.05 cm, again show substantial oscillation of the mode radii, indicative of unstable performance.

In this way, the effect of spacing parameter (a) may be analytically determined incrementally over a range of values for determining suitable values thereof to effect or discriminate mode-locked resonator performance over continuous wave performance with suitable stable operation in accordance with the present invention.

The principal conclusion to be drawn from FIGS. 16–23 is that a properly adjusted Ti:sapphire resonator will re-establish the mode-locked output energy format by virtue of dependence of the mode stability and convergence on peak power fluctuations due to the synchronous pumping. Conversely, these same attributes will prevent establishment of a stable non-mode-locked output format.

Accordingly, this analysis shows that:
1) Differentiation between cw and mode-locked output formats occurs due to ability of specific resonator configurations to support the associated spatial mode distribution.
2) Fluctuations in the spatial mode distribution, and hence amplitude stability of the laser output energy, depend critically on the detailed optical configuration of the laser resonator, e.g. distances between the optics and optic orientations.
3) The resonator optical configuration can be designed to support specific output formats: e.g. femtosecond mode-locked pulses under conditions of synchronous pumping while the cw output format will not be supported.

Consequently, laser resonator 22, illustrated in FIG. 7, may be initially aligned in accordance with the method disclosed above with respect to FIGS. 1 and 5 for optimizing the tilt of first and second mirrors M1, M2 by suitably varying the separation spacing L. Resonator 22 may then be further adjusted for ensuring discrimination of mode-locked operation over continuous wave operation as described above and also illustrated in the flow chart of FIG. 5. The optical alignment of resonator 22 is further adjusted by the step 62 of initially positioning laser crystal 12 at about equal spacings $S_1, S_2$, with a=0 between first and second mirrors M1, M2. The crystal position (a) may then, at step 63, be adjusted either left or right, as illustrated in FIG. 7, at a constant or fixed value of separation spacing L, to within a predetermined position range selected for a specific value of the peak-to-critical power ratio $P/P_{crit}$ of the laser beam in pulse mode for self-focusing in the resonator to effect discrimination or determination of the mode-locked operation over continuous wave operation at step 64 of FIG. 5.

In the preferred embodiment, adjustment of the optical alignment of the several elements of laser resonator 22, illustrated in FIG. 7, preferably includes adjustment of both tilt of focusing mirrors M1,M2, and intracavity position (a) of crystal 12 between the mirrors M1, M2. However, adjustment of only the intracavity position of the crystal 12 between the mirrors for effecting mode-locked discrimination may alternatively be used in a suitable laser resonator.

As indicated above, discrimination may be effected in accordance with the present invention by adjusting the intracavity position of crystal 12 without use of a conventional aperture or slit. Aperture 24, illustrated in FIG. 7, is provided solely for bandwidth control, and does not operate to control discrimination. Accordingly, in lieu of employing a separate or dedicated aperture or slit for effecting mode-locking discrimination, such mode-locking discrimination is effected instead by adjusting the crystal position (a) within the predetermined position range required for operating resonator 22 at specific $P/P_{crit}$ power ratios.

In the exemplary embodiment disclosed above for a power ratio of 0.70, a suitable range for crystal position a is within at least −0.03 cm and +0.01 cm. This position range is small, being less than about 1 mm, with the position of crystal 12 being adjusted in increments less than about a single (1) mm, for example in tenths of a millimeter. Consequently, relatively crude or large adjustment of the position of crystal 12 will fail to achieve mode-locked discrimination in accordance with this invention; instead, a conventional discriminating aperture would be required.

A significant feature of the present invention is the recognition that crystal 12 may be optimally and critically positioned for effecting discrimination at specific power ratios. Application of the analysis described above for a particular laser resonator design will reveal the required position range for crystal 12 between the two mirrors M1, M2, which will then allow an operator to specifically adjust crystal position within very small tolerances for effecting discrimination. The invention, therefore, allows the operator to more quickly effect alignment of resonator 22, with a suitable critical position of crystal 12 between mirrors M1, M2, to effect mode-locked discrimination.

Another significant advantage of the invention is that discrimination may be effected at various power ratios for which corresponding position ranges of spacing parameter (a) may be obtained.

For the example of a Kerr crystal 12 in titanium-sapphire form, tilt angles of 110° for the two focusing mirrors M1, M2, and a power ratio of 0.70, the exemplary position range is −0.03 cm to about +0.01 cm. Recognizing the sign convention for spacing parameter (a) in FIG. 7, this exemplary position range spaces crystal 12 closer to second mirror M2 than to first mirror M1 to effect the mode-locking discrimination. In this extremely small position range, it is critical to accurately position crystal 12 within this range to achieve discrimination. Accordingly, crystal 12 is preferably centered within this range which, in this one example, positions it closer to the second mirror than to the first mirror.

Extension of the present invention supports mode-locking discrimination at relatively high power ratios which are not achievable conventionally. For example, a suitable position range for crystal 12 may be identified for operating laser resonator 22 at $P/P_{crit}$ power ratios not only up to and including 1.0, but also greater than 1.0. With increasing power ratio, the pulse duration of laser beam 16 may be significantly reduced into relatively low values of femtoseconds, providing significantly enhanced performance over conventional KLM resonators. For example, the material of the transmissive optical elements of FIG. 7 may be selected to support the shorter pulse durations at the higher $P/P_{crit}$ ratios.

As previously indicated, laser pump 14 is preferably optically aligned with second reflector M4 to pump crystal 12. Second reflector M4 is effective for passing the laser beam from pump 14, which operates at a different wavelength than that of laser beam 16 propagated by laser resonator 22. Reflector M4 is highly reflective for the wavelength of laser beam 16, yet transmissive to the wavelength of the pump beam. Significant advantages accrue to pumping resonator 22 through second reflector M4, including: avoiding distortions from curved transmission optics; improved mode-matching; and avoiding chromatic aberrations from lenses.

The optical alignment process, which may take up to several months to accomplish in order to achieve stable operation of the laser system with suitable performance, may be substantially improved and shortened in time by use of the present invention, since the specified critical alignments may be singled out for suitable adjustment to obtain desired performance of the resonator. For example, the tilt of first and second focusing mirrors M1, M2 may be adjusted in accordance with the invention for quickly effecting optimal performance thereof. Furthermore, this may in turn be followed by the critical placement (a) of laser crystal 12 between focusing mirrors M1, M2 while maintaining a constant value of separation spacing L. Attention to accurate positioning of crystal 12 within a suitable position range of spacing parameter (a) will more quickly lead to suitable alignment of resonator 22 for effecting stable operation with mode-locking discrimination, while avoiding undesirable continuous wave operation. This may be accomplished without requiring use of a conventional separate aperture or slit to effect mode-locked discrimination.

The improved laser resonator 22 may therefore enjoy optimum performance and stability in mode-locked operation, with the optical alignment process being effected in a substantially shorter time than heretofore possible.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. In a laser resonator including a laser medium disposed in optical alignment between spaced apart first and second optical elements, a method for adjusting said optical alignment comprising:

pumping said medium to produce a laser beam;

adjusting separation spacing between said first and second elements;

observing cross-sectional size of said laser beam; and adjusting tilt of at least one of said first and second elements in response to any observed change in said beam size.

2. A method according to claim 1 wherein the step of observing cross-sectional size of said laser beam comprises observing beam size in first and second orthogonal directions for any increase or decrease thereof, the step of adjusting separation spacing comprises decreasing said separation spacing, and wherein the step of adjusting tilt comprises increasing or decreasing said tilt upon observed increase in said beam size in said first direction or upon observed increase in said beam size in said second direction, respectively.

3. A method according to claim 1 wherein the step of observing cross-sectional size of said laser beam comprises observing beam size in first and second orthogonal directions for any increase or decrease thereof, the step of adjusting separation spacing comprises increasing said separation spacing, and wherein the step of adjusting tilt comprises decreasing or increasing said tilt upon observed increase in said beam size in said first direction or upon observed increase in said beam size in said second direction, respectively.

4. A method according to claim 1 and further comprising repeating the steps of adjusting separation spacing, observing beam size, and adjusting tilt so as to obtain a value of said separation spacing at which further changes therefrom effect substantially no change in said beam size.

5. A method according to claim 1 and further comprising:

generating a plurality of data sets at respective values of tilt for beam size in first and second orthogonal directions over a range of said separation spacing to identify stable and unstable regions of operation of said resonator; and determining required tilt change from said data sets for obtaining substantially symmetrical change in said beam size in said first and second directions upon change in said separation spacing.

6. A method according to claim 1 wherein:

said laser medium includes opposite end faces inclined at Brewster's angle; and said first and second elements comprise curved focusing mirrors tilted toward said end faces.

7. A method according to claim 1 wherein said laser medium comprises Ti:sapphire, said method further comprising:

initially positioning said laser medium at substantially equal spacings between said first and second elements; and adjusting the position of said medium to within a position range selected for a specific value of a power ratio of intracavity peak power of circulation of said laser beam and a critical power for self-focusing, while holding said separation spacing at a constant value, to effect discrimination of mode-locked operation over continuous wave operation.

8. A method according to claim 7 wherein said position range is less than about 1 mm, and said medium position is adjusted in increments less than 1 mm.

9. A method according to claim 7 wherein said power ratio is selected to be greater than about 1.0 in stable mode-locked operation.

10. A laser resonator optically aligned in accordance with the method of claim 1.

11. A laser resonator optically aligned in accordance with the method of claim 7.

12. In a Kerr-Lens-Modelocking (KLM) laser for producing a laser beam and having a resonator including a Kerr medium having opposite end faces inclined at Brewster's angle, said medium being disposed in optical alignment between spaced-apart and tilted first and second optical elements, a method of adjusting said optical alignment comprising:

initially positioning said Kerr medium at substantially equal spacings between said first and second elements, said tilted first and second optical elements being separated from each other by a predetermined distance; and adjusting the position of said medium to within a position range selected for a specific value of a power ratio of intracavity peak power of circulation of said laser beam and a critical power for self-focusing to effect discrimination of mode-locked operation over continuous wave operation.

13. A method according to claim 12 including the step of adjusting position of said Kerr medium to re-establish mode-locked operation by dependence of mode stability and convergence on peak power fluctuations due to synchronous pumping.

14. A method according to claim 13 including the steps of:

observing cross-sectional size of said laser beam; and adjusting tilt of at least one of said first and second optical elements in response to any observed change in beam size.

15. A laser having a resonator therein, said resonator comprising:

a Kerr laser crystal having opposite end faces inclined at Brewster's angle;

first and second focusing mirrors spaced apart at a predetermined separation spacing, said mirrors being optically aligned with respective ones of said crystal end faces and tilted relative thereto;

a first reflector optically aligned with said second mirror;

a second reflector optically aligned with said first mirror;

a first prism optically aligned with said second reflector;

an output coupler;

a second prism optically aligned with said first prism and said output coupler; and a laser pump optically aligned with said crystal for optically pumping said crystal to generate a laser beam in said resonator;

said crystal being disposed within a specific position range for a specific value of said separation spacing, and for a specific value of a power ratio of intracavity peak power of circulation of said laser beam and a critical power for self-focusing to effect discrimination of mode-locked operation over continuous wave operation.

16. A laser according to claim 15 wherein said laser crystal is positioned between said first and second mirrors to re-establish mode-locked operation by dependence of mode stability and convergence on peak power fluctuations due to synchronous pumping.

17. A laser according to claim 15 wherein said laser pump is optically aligned with said second reflector to pump said crystal.

18. A laser according to claim 16 wherein said first and second reflectors are each tilted at an angle to effect said discrimination of mode-locked operation.

19. A laser according to claim 15 wherein:

said laser crystal comprises titanium-sapphire;

said power ratio is substantially 0.7; and said laser crystal is spaced closer to said second mirror than to said first mirror to effect said discrimination of mode-locked operation.

20. A laser according to claim 15 wherein said power ratio is greater than about 1.0, and said laser medium is spaced between said first and second mirrors to effect said discrimination of mode-locked operation.

* * * * *